(12) United States Patent
Ohno et al.

(10) Patent No.: US 8,029,591 B2
(45) Date of Patent: Oct. 4, 2011

(54) INORGANIC FIBER AGGREGATE, METHOD FOR MANUFACTURING INORGANIC FIBER AGGREGATE, HONEYCOMB STRUCTURE, METHOD FOR MANUFACTURING HONEYCOMB STRUCTURE, AND EXHAUST GAS PURIFIER

(75) Inventors: Kazushige Ohno, Ibi-gun (JP); Masao Shimizu, Ibi-gun (JP); Chiemi Matsuo, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 65 days.

(21) Appl. No.: 11/777,772

(22) Filed: Jul. 13, 2007

(65) Prior Publication Data

US 2007/0289275 A1    Dec. 20, 2007

Related U.S. Application Data

(63) Continuation of application No. PCT/JP2006/303071, filed on Feb. 21, 2006.

(30) Foreign Application Priority Data

Mar. 2, 2005    (JP) ................................ 2005-057838

(51) Int. Cl.
    *B01D 39/20*    (2006.01)
(52) U.S. Cl. ......... 55/523; 55/524; 55/527; 55/DIG. 30; 422/177; 428/116
(58) Field of Classification Search ............ 55/522, 55/523, 524, 527, 485; 422/177, 180; 428/116
    See application file for complete search history.

(56) References Cited

U.S. PATENT DOCUMENTS

| | | | |
|---|---|---|---|
| 5,290,350 A | | 3/1994 | Besnard et al. |
| 5,322,537 A | * | 6/1994 | Nakamura et al. ............. 55/523 |
| 5,486,410 A | * | 1/1996 | Groeger et al. ............. 442/353 |
| 5,914,187 A | * | 6/1999 | Naruse et al. ................. 428/327 |
| 6,417,125 B1 | * | 7/2002 | Rorabaugh et al. .......... 501/95.1 |
| 6,669,751 B1 | * | 12/2003 | Ohno et al. .................... 55/523 |
| 6,984,253 B2 | * | 1/2006 | Ichikawa et al. ............... 55/484 |
| 7,112,233 B2 | * | 9/2006 | Ohno et al. .................... 55/523 |
| 7,311,750 B2 | * | 12/2007 | Ohno et al. .................... 55/523 |
| 7,341,614 B2 | * | 3/2008 | Hayashi et al. ................. 55/523 |
| 7,348,049 B2 | * | 3/2008 | Yoshida ........................ 428/116 |
| 7,387,657 B2 | * | 6/2008 | Kunieda et al. ................ 55/523 |
| 7,393,376 B2 | * | 7/2008 | Taoka et al. .................... 55/523 |
| 7,427,308 B2 | * | 9/2008 | Taoka et al. .................... 55/523 |
| 7,427,309 B2 | * | 9/2008 | Ohno et al. .................... 55/523 |

(Continued)

FOREIGN PATENT DOCUMENTS

EP    1 142 619    10/2001

(Continued)

OTHER PUBLICATIONS

Extended European Search Report, EP 06714211.7, mailed Jul. 19, 2007.

(Continued)

*Primary Examiner* — Robert A Clemente
(74) *Attorney, Agent, or Firm* — Ditthavong Mori & Steiner, P.C.

(57) ABSTRACT

An inorganic fiber aggregate includes an inorganic material and inorganic fibers on which the inorganic material is provided to fix the inorganic fibers each other.

32 Claims, 9 Drawing Sheets

U.S. PATENT DOCUMENTS

| | | |
|---|---|---|
| 7,429,285 B2 * | 9/2008 | Kuki et al. .................. 55/523 |
| 7,435,279 B2 * | 10/2008 | Masukawa et al. ............ 55/523 |
| 7,455,709 B2 * | 11/2008 | Ohno et al. .................. 55/523 |
| 7,486,962 B2 * | 2/2009 | Zuberi et al. ................ 455/523 |
| 2003/0165638 A1 * | 9/2003 | Louks et al. ................. 427/600 |
| 2004/0055265 A1 | 3/2004 | Ohno et al. |
| 2004/0234428 A1 | 11/2004 | Tanahashi et al. |
| 2005/0169819 A1 | 8/2005 | Shibata |
| 2005/0266991 A1 | 12/2005 | Ohno et al. |
| 2006/0075731 A1 | 4/2006 | Ohno et al. |
| 2007/0017196 A1 * | 1/2007 | Choi et al. .................. 55/523 |
| 2007/0039295 A1 * | 2/2007 | Ohno ........................... 55/482 |
| 2007/0107395 A1 * | 5/2007 | Zuberi et al. ................ 55/523 |
| 2007/0107396 A1 * | 5/2007 | Zuberi ......................... 55/523 |
| 2007/0148402 A1 | 6/2007 | Ohno et al. |
| 2008/0083201 A1 | 4/2008 | Oya et al. |
| 2008/0176013 A1 | 7/2008 | Ohno et al. |
| 2008/0276586 A1 | 11/2008 | Oya et al. |
| 2008/0289307 A1 * | 11/2008 | Ogyu et al. .................. 55/523 |
| 2008/0295470 A1 | 12/2008 | Ogyu et al. |

FOREIGN PATENT DOCUMENTS

| | | |
|---|---|---|
| EP | 1 489 277 | 12/2004 |
| FR | 2669624 | 5/1992 |
| JP | 56-165097 | 12/1981 |
| JP | 62-125060 | 6/1987 |
| JP | 04-002673 | 1/1992 |
| JP | 06-190287 | 7/1994 |
| JP | 06/219812 | 8/1994 |
| JP | 10-328516 | 12/1998 |
| JP | 2001-224967 | 8/2001 |
| WO | WO 03/081001 | 10/2003 |
| WO | WO 2005/000445 A1 | 1/2005 |
| WO | WO 2005005018 A1 * | 1/2005 |
| WO | WO 2006025283 A1 * | 3/2006 |

OTHER PUBLICATIONS

International Search Report, PCT/JP2006/303071, mailed May 30, 2006.

English translation of International Preliminary Report on Patentability (Written Opinion of the International Serching Authority), PCT/JP2006/303071, mailed May 30, 2006.

Japanese Office Action for corresponding JP Application No. 2007-505857, Jun. 21, 2011.

* cited by examiner

A-A line cross-sectional view

INORGANIC FIBER AGGREGATE, METHOD FOR MANUFACTURING INORGANIC FIBER AGGREGATE, HONEYCOMB STRUCTURE, METHOD FOR MANUFACTURING HONEYCOMB STRUCTURE, AND EXHAUST GAS PURIFIER

CROSS-REFERENCE TO RELATED APPLICATIONS

This application is a continuation application of PCT/JP2006/303071 filed on Feb. 21, 2006, which claims priority of Japanese Patent Application No. 2005-057838 filed on Mar. 2, 2005. The contents of these applications are incorporated herein by reference in their entirety.

BACKGROUND OF THE INVENTION

1. Field of the Invention

The present invention relates to an inorganic fiber aggregate, a method for manufacturing an inorganic fiber aggregate, a honeycomb structure using the inorganic fiber aggregate, a method for manufacturing a honeycomb structure, and an exhaust gas purifier.

2. Discussion of the Background

Particulates, such as soot, contained in exhaust gases discharged from internal combustion engines of vehicles, such as buses and trucks, and construction machines, have raised serious problems as contaminants harmful to the environment and the human body. Conventionally, various kinds of filters, used for capturing particulates in exhaust gases and purifying the exhaust gases, have been proposed, and filters having a honeycomb structure have also been known.

For example, a honeycomb structure, which is manufactured by corrugating inorganic sheets obtained through forming of inorganic fibers made of alumina, silica, mullite or the like into a sheet, has been proposed (for example, see JP-A H04-2673).

Moreover, a honeycomb structure in which a catalyst supporting layer made of an inorganic material has been formed on the entire surface of a porous sintered body made of metal fibers has also been known (for example, see JP-A 2001-224967). The contents of JP-A H04-2673 and JP-A 2001-224967 are incorporated herein by reference in their entirety.

SUMMARY OF THE INVENTION

According to one aspect of the present invention, an inorganic fiber aggregate includes an inorganic material and inorganic fibers on which the inorganic material is provided to fix the inorganic fibers each other.

According to another aspect of the present invention, a method for manufacturing an inorganic fiber aggregate includes mixing first inorganic fibers with second inorganic fibers and/or inorganic particles and heating the mixture at a temperature below an upper temperature limit of the first inorganic fibers and above a softening temperature of the second inorganic fibers and/or the inorganic particles. The second inorganic fibers and inorganic particles melt at a temperature at which the first inorganic fibers are neither melted nor sublimated.

According to further aspect of the present invention, a honeycomb structure has a plurality of through holes extending along a longitudinal direction of the honeycomb structure. The honeycomb structure includes inorganic fiber aggregates each of which has element through holes formed therein and which are laminated in the longitudinal direction in such a way that the element through holes are superposed on one another to form the plurality of through holes separated by walls. The inorganic fiber aggregates include inorganic fibers and an inorganic material. The inorganic material is provided on the inorganic fibers to fix the inorganic fibers each other.

According to the other aspect of the present invention, a method for manufacturing a honeycomb structure includes mixing first inorganic fibers with second inorganic fibers and/or inorganic particles to prepare a mixture, forming the mixture into a sheet-shaped mixture, forming through holes in the sheet-shaped mixture while the sheet-shaped mixture is being formed or after the sheet-shaped mixture is formed, heating the sheet-shaped mixture with the through holes formed therein at a temperature below an upper temperature limit of the first inorganic fibers and above a softening temperature of the second inorganic fibers and/or the inorganic particles so that a sheet-shaped inorganic fiber aggregate is manufactured, and laminating the inorganic fiber aggregate such that the through holes are superposed on one another. The second inorganic fibers and inorganic particles melt at a temperature at which the first inorganic fibers are neither melted nor sublimated.

According to further aspect of the present invention, a honeycomb structure has a plurality of through holes extending along a longitudinal direction of the honeycomb structure. The honeycomb structure includes inorganic fiber aggregates each of which has element through holes formed therein and which are laminated in the longitudinal direction in such a way that the element through holes are superposed on one another to form the plurality of through holes separated by walls. The inorganic fiber aggregates include inorganic fibers and an inorganic material. The inorganic material includes glass that melts at a temperature at which the inorganic fibers are neither melted nor sublimated. The inorganic material is locally provided at intersections of the inorganic fibers to fix the inorganic fibers at the intersections each other.

According to further aspect of the present invention, an exhaust gas purifier for a vehicle includes a honeycomb structure having a plurality of through holes extending along a longitudinal direction of the honeycomb structure. The honeycomb structure includes inorganic fiber aggregates each of which has element through holes formed therein and which are laminated in the longitudinal direction in such a way that the element through holes are superposed on one another to form the plurality of through holes separated by walls. The inorganic fiber aggregates includes inorganic fibers and an inorganic material. The inorganic material is provided on the inorganic fibers to fix the inorganic fibers each other.

According to further aspect of the present invention, an exhaust gas purifier for a vehicle includes a honeycomb structure having a plurality of through holes extending along a longitudinal direction of the honeycomb structure. The honeycomb structure includes inorganic fiber aggregates each of which has element through holes formed therein and which are laminated in the longitudinal direction in such a way that the element through holes are superposed on one another to form the plurality of through holes separated by walls. The inorganic fiber aggregates include inorganic fibers and an inorganic material. The inorganic material includes glass that melts at a temperature at which the inorganic fibers are neither melted nor sublimated. The inorganic material is locally provided at intersections of the inorganic fibers to fix the inorganic fibers at the intersections each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a cross-sectional view that schematically shows a portion of an inorganic fiber aggregate according to the embodiments of the present invention.

FIG. 7A shows an image thereof at magnification of ×300 and FIG. 7B shows an image thereof at magnification of ×1000.

FIG. 10A shows an image thereof at magnification of ×300 and FIG. 10B shows an image thereof at magnification of ×1500.

FIG. 12A shows an image thereof at magnification of ×300 and FIG. 12B shows an image thereof at magnification of ×2000.

DESCRIPTION OF THE EMBODIMENTS

Figure 1:
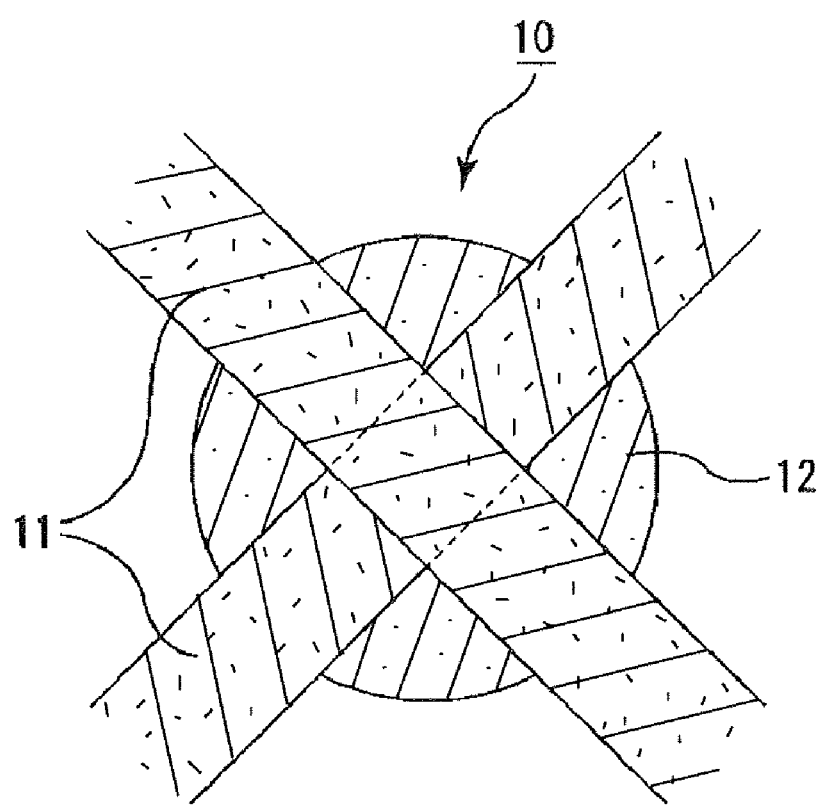

The embodiments will now be described with reference to the accompanying drawings, wherein like reference numerals designate corresponding or identical elements throughout the various drawings.

First, the following description will explain the inorganic fiber aggregate according to the embodiments of the present invention. The inorganic fiber aggregate according to the embodiments of the present invention includes inorganic fibers and an inorganic material, wherein the inorganic material sticks firmly to a portion on a surface of the inorganic fibers, and the inorganic fibers are firmly fixed to each other through the inorganic material.

The embodiments of the inorganic fiber aggregate include an inorganic fiber and an inorganic material. With respect to the material for the inorganic fiber, examples thereof include oxide ceramics such as silica-alumina, mullite, alumina, silica, titania and zirconia, nitride ceramics such as silicon nitride and boron nitride, carbide ceramics such as silicon carbide, and basalt. Each of these materials may be used alone, or two or more of these may be used in combination.

Among those materials the desirable example is at least one kind selected from the group consisting of silicon carbide, alumina, basalt, silica, silica alumina, titania and zirconia. This is because the inorganic fiber aggregate comprising these materials is excellent in heat resistance.

The lower limit value of the fiber length of the inorganic fibers is desirably about 0.1 mm, and the upper limit value thereof is desirably about 100 mm. The fiber length of about 0.1 mm or more makes it less difficult to firmly fix the inorganic fibers to each other through an inorganic material, providing a sufficient strength more easily; in contrast, the fiber length of about 100 mm or less makes it easier to manufacture a homogenous inorganic fiber aggregate, providing an inorganic fiber aggregate having sufficient strength more easily. The lower limit value of the fiber length is more desirably about 0.5 mm, and the upper limit value thereof is more desirably about 50 mm.

The lower limit value of the fiber diameter of the inorganic fibers is desirably about 0.3 µm, and the upper limit value thereof is desirably about 30 µm. The fiber diameter of about 0.3 µm or more tends to make each inorganic fiber difficult to bend, causing the resulting inorganic fiber aggregate to be less likely to be eroded. In contrast, the fiber diameter about 30 µm or less makes it less difficult to firmly fix the inorganic fibers to each other through an inorganic material, providing a sufficient strength more easily. The lower limit value of the fiber diameter is more desirably about 0.5 µm, and the upper limit value thereof is more desirably about 15 µm. Here, inorganic materials containing silica are desirably used as the inorganic material.

In each of the embodiments of the inorganic fiber aggregates, the inorganic material sticks firmly to a portion on a surface of the inorganic fiber, and the inorganic fibers are firmly fixed to each other through the inorganic material. Here, the portion where the inorganic fibers are fixed to each other corresponds to an intersection of the inorganic fibers, and the above-mentioned inorganic material desirably exists locally at the intersection of the inorganic fibers. Referring to the drawings, this structure will be explained.

FIG. 1 is a cross-sectional view that schematically shows a portion of the inorganic fiber aggregate according to the embodiments of the present invention. Here, the cross-sectional view of FIG. 1 indicates a cross section at which intersecting inorganic fibers are cut in a longitudinal direction. In the inorganic fiber aggregate 10 shown in FIG. 1, with respect to inorganic fibers 11 forming the inorganic fiber aggregate, an inorganic material 12 sticks firmly to an intersection of the inorganic fibers 11. In this manner, since the inorganic material 12 sticks firmly to the intersection of the inorganic fibers 11 so that the strength of the inorganic fiber aggregate 10 is improved, and it becomes easier to prevent loose inorganic fibers.

Moreover, in the inorganic fiber aggregate 10, the inorganic material 12 is locally present at the intersection of the inorganic fibers 11. Consequently, the inorganic fiber 11 is covered by the inorganic material 12 at the intersection with another inorganic fiber 11, but most of the other parts of the inorganic fibers 11 do not have the inorganic material firmly fixed thereto. Here, the intersection of the inorganic fibers refers to an area covering a distance within approximately ten times the fiber diameter of the inorganic fiber from the portion where the inorganic fibers are made closest to each other.

The tensile strength of the embodiments of the inorganic fiber aggregate is desirably about 0.3 MPa or more, more desirably about 0.4 MPa or more. The tensile strength of about 0.3 MPa or more makes it easy to provide sufficient reliability when the inorganic fiber aggregates are used for a honeycomb structure, as will be described later.

Here, the tensile strength may be measured through the following process: forming the inorganic fiber aggregate into a sheet shape; securing both ends of the inorganic fiber aggregate by jigs; and carrying out measurement using an Instron-type universal tester. If the embodiments of the above-mentioned inorganic fiber aggregate are used for a honeycomb structure, which will be described later, with respect to the apparent density, the lower limit value thereof is desirably about 0.02 g/cm$^3$, more desirably about 0.05 g/cm$^3$, and the upper limit value thereof is desirably about 1.00 g/cm$^3$. The apparent density of 0.02 g/cm$^3$ or more is less likely to cause an insufficient strength. In contrast, the apparent density about 1.00 g/cm$^3$ or less makes it difficult for the pressure loss of the honeycomb structure to become too high. Moreover, the lower limit value is more desirably about 0.10 g/cm$^3$, and the upper limit value is more desirably about 0.50 g/cm$^3$.

Moreover, with respect to the porosity of the embodiments of the inorganic fiber aggregate, the lower limit thereof is desirably about 60% by volume, and the upper limit thereof is desirably about 98% by volume. The porosity of about 60% by volume or more tends to make the pressure loss of the honeycomb structure less likely to be too high, when used for the honeycomb structure. In contrast, the porosity of about 98% by volume or less makes it easier to provide a sufficient strength, when used for the honeycomb structure. The lower limit of the porosity is more desirably about 70% by volume. Here, the apparent density and porosity can be measured through known methods, such as a weighing method, Archimedes method and a measuring method using a scanning electron microscope (SEM).

In the inorganic fiber aggregate, the intersection of the inorganic fibers to which the inorganic material firmly sticks desirably occupies about 20% or more of the entire intersections of the inorganic fibers. With the rate of about 20% or more, it becomes possible to obtain a sufficient strength in the inorganic fiber aggregate more easily. Here, the rate of the intersections of the inorganic fibers to which the inorganic material firmly sticks is obtained by the following processes: observing a plurality of portions on the inorganic fiber aggregate by a microscope; counting within each of the observation views the number of intersections of the inorganic fibers and the number of the intersections of the inorganic fibers to which the inorganic material firmly sticks so as to obtain the rate; and calculating the average value of the obtained rates.

The above-mentioned inorganic fiber aggregate may be used for a honeycomb structure, which will be described later, and in this case, it may also be applied to such a honeycomb structure on which a catalyst is supported. Therefore, a catalyst may be supported on the inorganic fiber aggregate.

Figure 2A:
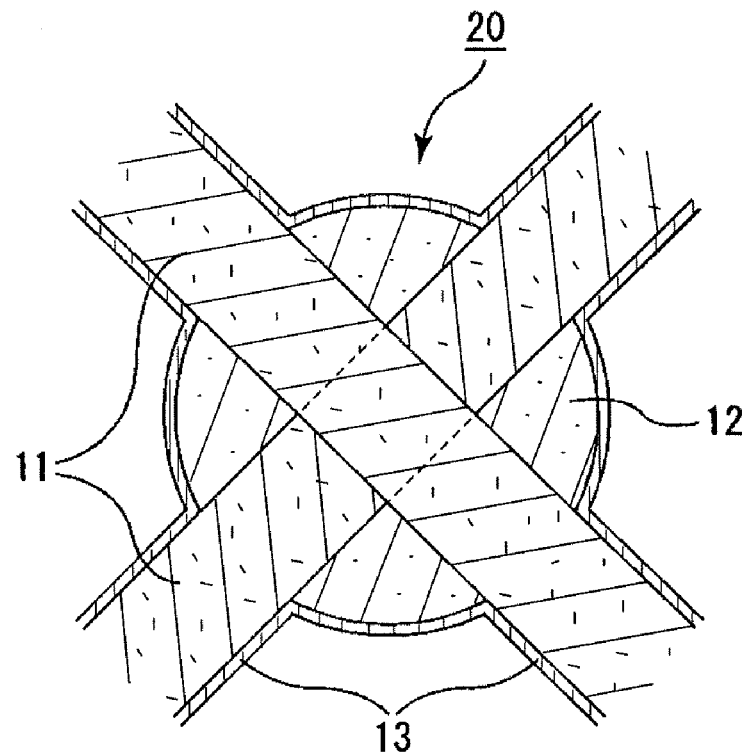
FIGS. 2A and 2B each is a cross-sectional view that schematically shows a portion of an inorganic fiber aggregate according to the embodiments of the present invention on which a catalyst is supported.
Figure 2B:
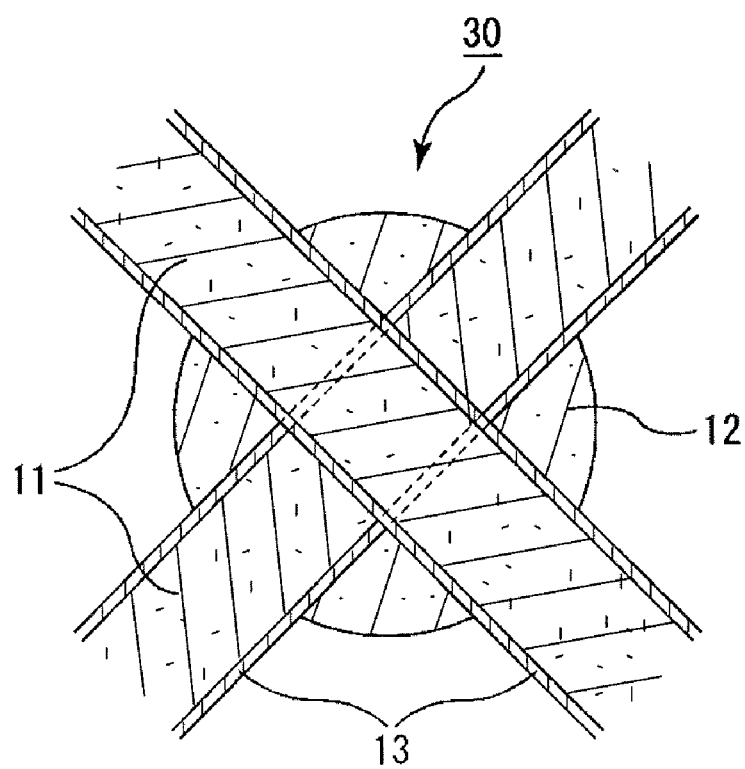

Referring to the drawings, the following description will discuss the inorganic fiber aggregate according to the embodiments of the present invention on which a catalyst is supported. FIGS. 2A and 2B are cross-sectional views that schematically show a portion of the inorganic fiber aggregate according to the embodiments of the present invention on which a catalyst is supported. Here, in the same manner as FIG. 1, each of FIGS. 2A and 2B also shows a cross section at which intersecting inorganic fibers are cut in a longitudinal direction. The inorganic fiber aggregate 20 shown in FIG. 2A has a structure in which a catalyst layer 13 is formed on the exposed face of the inorganic fiber aggregate 10 shown in FIG. 1.

Moreover, as shown in FIG. 2B, in the inorganic fiber aggregate 30, the catalyst layer 13 is formed on the entire surface of the inorganic fibers 11, and the inorganic fibers 11, coated with the catalyst layer 13, are firmly fixed to each other at the intersection thereof by an inorganic material 12. These inorganic fiber aggregates 20 and 30 are also included in one of the embodiments of the inorganic fiber aggregate of the present invention.

As described above, upon supporting a catalyst on the inorganic fiber aggregate according to the embodiments of the present invention, the catalyst may be supported on the entire surface of the inorganic fiber, or only on the portion on a surface of the inorganic fiber which is exposed after the inorganic material has been firmly fixed thereto. Moreover, although not shown in the drawings, in the mode of the embodiments of the inorganic fiber aggregate as shown in FIG. 2B, a catalyst layer may also be supported on the surface of the inorganic material. Furthermore, a catalyst may be supported only on a portion of the inorganic fiber and/or the inorganic material.

Examples of the catalyst include a catalyst comprising a noble metal such as platinum, palladium, rhodium and the like, although not limited thereto. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be supported.

A method to support a catalyst on the embodiments of the inorganic fiber aggregate will be described below. The inorganic fiber aggregate according to the embodiments of the present invention, comprising the above-mentioned structure may be desirably used for, for example, a honeycomb structure. Also, the inorganic fiber aggregate comprising the structure according to the embodiments of the present invention can be manufactured according to the embodiments of the method for manufacturing an inorganic fiber aggregate mentioned below.

The following description will explain the method for manufacturing an inorganic fiber aggregate according to the embodiments of the present invention. The method for manufacturing an inorganic fiber aggregate according to the embodiments of the present invention includes: mixing inorganic fibers A (first inorganic fibers) with inorganic fibers B (second inorganic fibers) and/or inorganic particles C that melt at a temperature at which the inorganic fibers A are neither melted nor sublimated; and heating the mixture at a temperature below a heat resistant temperature of the inorganic fibers A and above a softening temperature of the inorganic fibers B and/or the inorganic particles C.

The following is an explanation of the processes carried out in the above-mentioned method for manufacturing an inorganic fiber aggregate according to the embodiments of the present invention.

(1) Firstly, inorganic fibers A are mixed with inorganic fibers B and/or inorganic particles C that melt at a temperature at which the inorganic fibers A are neither melted nor sublimated, to obtain a mixture. The mixture obtained here includes those in which the inorganic fibers A and the inorganic fibers B and/or the inorganic particles C are dispersed in water. Examples of the inorganic fibers A may be the same with those inorganic fibers (inorganic fibers comprising silicon carbide, alumina or the like) described in the embodiments of the above-mentioned inorganic fiber aggregate.

The inorganic fibers A desirably include at least one kind selected from the group consisting of silicon carbide, alumina, basalt, silica, silica-alumina, titania and zirconia.

The reason for this is because it becomes easier to manufacture an inorganic fiber aggregate with excellent heat resistance.

With respect to the inorganic fibers B and/or the inorganic particles C, materials thereof are not particularly limited as long as they melt at a temperature where the inorganic fibers A are neither melted nor sublimated, and specific examples of the inorganic fibers B include inorganic glass fibers comprising silicate glass, silicate alkali glass, borosilicate glass or the like, and specific examples of the inorganic particles C include inorganic glass particles comprising silicate glass, silicate alkali glass, borosilicate glass or the like.

The lower limit value of the fiber length of the inorganic fibers B is desirably about 0.1 mm and the upper limit value thereof is desirably about 100 mm. When the fiber length is about 0.1 mm or more, it becomes easier to fix the inorganic fibers A with each other using an inorganic material, and thus a sufficient strength may be easily obtained. On the other hand, the fiber length of about 100 mm or less makes it easier to carry out uniform dispersing upon preparation of the mixture, thereby upon carrying out heating in the following procedures, it is less likely to happen that fixing portion at the intersection of the inorganic fibers A tend to become small due to the inorganic fibers B and/or the inorganic particles C not dispersed uniformly. The lower limit value of the fiber length is more desirably about 0.5 mm and the upper limit value thereof is more desirably about 50 mm.

The lower limit value of the fiber diameter of the inorganic fibers B is desirably about 0.3 µm, and the upper limit value thereof is desirably about 30 µm. The fiber diameter of about 0.3 µm or more tends to make each inorganic fiber difficult to bend, causing the resulting inorganic fiber aggregate to be less likely to be eroded and, in contrast, the fiber diameter of about 30 µm or less makes it easier to firmly fix the inorganic fibers A to each other through an inorganic material, providing a sufficient strength more easily.

The lower limit value of the particle diameter of the inorganic particles C is desirably about 1 µm, and the upper limit thereof is desirably about 100 µm. The particle diameter of about 1 µm or more causes a need for a flocculant, and makes it easier to carry out uniform dispersing. In contrast, upon preparing a mixture, the particle diameter of about 100 µm or less makes it easier to carry out uniform dispersing, and makes it difficult to cause a less fixing portion at the intersection of the inorganic fibers A due to the fact that during heating, the inorganic fibers B and/or the inorganic particles C are not dispersed uniformly.

Upon mixing the inorganic fibers A with the inorganic fibers B and/or the inorganic particles C, a compounding ratio (weight ratio) of the inorganic fibers A to the inorganic fibers B and/or the inorganic particles C is desirably in the range of about 2:8 to about 8:2. When the compounding ratio of the inorganic fibers A is within the above-mentioned range, the inorganic material is less likely to be fixed in a manner so as to coat the surface of the inorganic fiber, and is more likely to be fixed locally. As a result, the flexibility of the resulting inorganic fiber aggregate body is less likely to become insufficient. Further, it is difficult for the number of the fixing portions between the inorganic fibers to become smaller; thus, it is difficult for the strength of the resulting inorganic fiber aggregate to become insufficient.

Moreover, upon preparing the mixture, water and a dispersant may be added thereto, if necessary, so as to uniformly mix the inorganic fibers A with the inorganic fibers B and/or the inorganic particles C. Furthermore, an organic binder may be added thereto. By adding the organic binder, the inorganic fibers A in addition to the inorganic fibers B and/or the inorganic particles C are made positively entangled with each other and the inorganic fibers B and/or the inorganic particles C are made to hardly come off the mutual inorganic fibers A before firing so that it becomes possible to more positively and firmly fix the inorganic fibers A to each other.

(2) On the mixture which has been thus prepared, heating is carried out at a temperature below the heat resistant temperature of the inorganic fibers A and above the softening temperature of the inorganic fibers B and/or the inorganic particles C. By carrying out the heating, it is possible to manufacture an inorganic fiber aggregate in which the inorganic fibers A are firmly fixed to each other through an inorganic material that contains the inorganic fibers B and/or the inorganic particles C as materials or is composed of the same material as each of these, where most of the firmly fixed portions are at the intersections of the inorganic fibers A, and in which the inorganic material that contains the inorganic fibers B and/or the inorganic particles C as materials or is composed of the same material as each of these, exists locally at the intersections.

The heating temperature is appropriately selected by taking into consideration the combination among the inorganic fibers A in addition to the inorganic fibers B and/or the inorganic particles C. Here, the heat resistant temperature of the inorganic fibers A is exemplified as: alumina>1300° C., silica>1000° C., silicon carbide>1600° C., silica-alumina>1200° C.

With respect to a specific heating temperature, although not generally determined since it depends on the heat resistant temperature and the softening temperature of the inorganic fibers and the inorganic material, it is considered that the desirable temperature is at least about 900° C. and at most about 1050° C., if inorganic glass is used as a main constituent of the inorganic fibers B and/or the inorganic particles C. When the heating temperature is about 900° C. or more, although the inorganic material sticks firmly to a portion at the surface of the inorganic fibers, it becomes easier for the inorganic fibers to be firmly fixed to each other; in contrast, the heating temperature of about 1050° C. or less tends not to cause cracks in the inorganic material that firmly sticks to the inorganic fibers.

In the method for manufacturing an inorganic fiber aggregate in accordance with the embodiments of the present invention, after the mixture has been prepared, sheet-forming or fiber laminating, such as blowing, may be carried out, and the above-mentioned heating may then be conducted so that a sheet-shaped inorganic fiber aggregate is manufactured. When a sheet-shaped inorganic fiber aggregate is manufactured through these processes, the resulting inorganic fiber aggregate can be appropriately used as the honeycomb structure according to an embodiment of the present invention, which will be described later.

In the sheet-forming, forming of the above-mentioned mixture into a sheet is carried out by using a mesh in which holes having a predetermined shape are formed with mutually predetermined intervals, and the resulting material is dried at a temperature of at least about 100° C. and at most about 200° C. so that a sheet-processed sheet having a predetermined thickness is obtained. The thickness of each sheet-processed sheet is desirably at least about 0.1 mm and at most about 20 mm.

Moreover, when, upon preparation of the mixture, water is added thereto to prepare the mixture, drying is desirably carried out prior to the heating so that water is removed from the mixture.

Moreover, in the method for manufacturing an inorganic fiber aggregate according to the embodiments of the present invention, an acid treatment may be carried out on the sheet-shaped inorganic fiber aggregate, manufactured by the above-mentioned method.

By carrying out the acid treatment, it becomes possible to improve the heat resistance of the inorganic fiber aggregate. The acid treatment can be carried out by immersing the inorganic fiber aggregate in a solution, such as hydrochloric acid and sulfuric acid.

With respect to conditions of the acid treatment in the case where inorganic glass is used as the main constituent of the inorganic material, the concentration of the treatment solution is desirably at least about 1 mol/L and at most about 10 mol/L, the treatment time is desirably at least about 0.5 hour and at most about 24 hours, and the treatment temperature is desirably at least about 70° C. and at most about 100° C. By carrying out the acid treatment under these conditions, components other than silica are eluted so that it becomes possible to improve the heat resistance of the inorganic fiber aggregate.

In the method for manufacturing the inorganic fiber aggregate according to the embodiments of the present invention, an inorganic fiber aggregate on which a catalyst is supported can also be manufactured. In this case, for example, a method in which a catalyst is preliminarily supported on the inorganic fibers A may be used. More specifically, for example, the inorganic fibers A are immersed in a slurry of an oxide on which a catalyst made of noble metal such as Pt has been supported, and then taken out thereof and heated so that the inorganic fibers A to which the catalyst has adhered is prepared; thus, an inorganic fiber aggregate is manufactured by using the inorganic fibers A to which the catalyst has adhered so that the inorganic fiber aggregate on which the catalyst is supported can be manufactured. Upon supporting the catalyst on the inorganic fibers A, after the inorganic fibers have been immersed in a slurry containing the catalyst, the inorganic fibers may be taken out, and then heated so that the catalyst can be directly adhered to the inorganic fibers.

Moreover, another method may be used in which, after an inorganic fiber aggregate has been manufactured through the above-mentioned process, this inorganic fiber aggregate is immersed in a slurry of an oxide on which a catalyst made of noble metal such as Pt is supported or a slurry containing the catalyst, and then taken out and heated. The former method can manufacture an inorganic fiber aggregate of a mode shown in FIG. 2B, and the latter method can manufacture an inorganic fiber aggregate of a mode shown in FIG. 2A.

Moreover, still another method may be used to support a catalyst thereon. More specifically, for example, after an inorganic fiber aggregate has been manufactured, this inorganic fiber aggregate may be immersed in a solution containing about 10 g of $CZ(nCeO_2.mZrO_2)$, about 1 L (litter) of ethanol, about 5 g of citric acid and an appropriate amount of a pH adjusting agent for about 5 minutes, and then firing is carried out at about 500° C. so that the catalyst is supported thereon. In this case, the amount of catalyst adhered to the inorganic fiber aggregate can be adjusted by repeating the above-mentioned immersing and firing.

The following description will explain the honeycomb structure according to the embodiments of the present invention. The honeycomb structure according to the embodiments of the present invention is a pillar-shaped honeycomb structure in which a plurality of through holes are placed in parallel with one other in a longitudinal direction with a wall portion therebetween, wherein the honeycomb structure includes the inorganic fiber aggregates in accordance with the embodiments of the present invention, and the inorganic fiber aggregates, each having through holes formed therein, are laminated in the longitudinal direction in such a way that the through holes formed therein are superposed on one another.

In the honeycomb structure according to the embodiments of the present invention, through holes are placed in parallel with each other in the longitudinal direction, and the through holes may be normal through holes with no sealed portions in both ends, or may be through holes with either one of the both ends being sealed (hereinafter, referred to as a bottomed hole).

Upon forming an inorganic fiber aggregate having the through holes, sheet-forming may be carried out by using a mesh in which holes corresponding to the through holes have been formed, or machining for forming holes at portions corresponding to the through holes may be carried out after an inorganic fiber aggregate without holes corresponding to the through holes has been formed.

If the through holes are prepared as normal through holes, the above-mentioned honeycomb structure is not allowed to function as a filter; however, by allowing a catalyst to adhere to portions including the through holes, it is allowed to function as a converting device (catalyst supporting carrier) for toxic gases.

In contrast, if a number of the through holes are prepared as the bottomed holes with either one end of which is sealed, the honeycomb structure is allowed to function as a filter, and when a catalyst is adhered thereto, it also become possible to function as a filter and a purifying and/or converting device for toxic gases.

The following description will mainly discuss the embodiments of a honeycomb structure that functions as a filter; however, as described above, the honeycomb structure according to the embodiments of the present invention may also have a function as the converting device for toxic gases.

Since the honeycomb structure according to the embodiments of the present invention uses the inorganic fiber aggregate according to the embodiments of the present invention as its constituent material, it has a sufficient strength, loose inorganic fibers are hardly caused, and the honeycomb structure is also hardly subjected to erosion. Moreover, since its constituent materials are mainly inorganic fibers, it becomes easier to obtain a honeycomb structure having a high porosity. For this reason, the pressure loss is reduced to a lower level, and the chance of particulates contacting to the catalyst adhered to the inorganic fibers increases so that it becomes possible for particulates to be burned more easily. Furthermore, since its thermal capacity tends to be small, it becomes easier for the temperature of the honeycomb structure to be raised to an active temperature of the catalyst earlier by exhaust heat discharged from an internal combustion engine. In particular, in the case of a mode in which a filter is placed right below the engine so as to effectively utilize its exhaust heat, this effect is exerted more efficiently.

If the filter is placed right below the engine, the space for the filter is extremely limited, with the result that the filter needs to be formed into a complicated shape; however, since the honeycomb structure according to the embodiments of the present invention is formed by laminating the inorganic fiber aggregates in the longitudinal direction, it becomes possible to more easily form the honeycomb structure into an appropriate shape without losses of the materials.

Upon carrying out regenerating, a great temperature difference is caused in the longitudinal direction of the filter due to burning of particulates; thus, a great thermal stress is imposed on the filter. However, the honeycomb structure according to the embodiments of the present invention has a structure in which the inorganic fiber aggregates are laminated in the longitudinal direction so that, even if a great temperature difference occurs in the entire filter, the temperature difference occurring per each of the units is likely to be small and the resulting thermal stress is also likely to be small, making damages such as cracks hardly occur.

In particular, the above-mentioned filter having a complicated shape becomes extremely fragile to a thermal stress because of its shape; however, the honeycomb structure according to the embodiments of the present invention makes damages such as cracks hardly occur as described above, even if it has a complicated shape.

Moreover, in the honeycomb structure according to the embodiments of the present invention, since a catalyst can be adhered to the inorganic fiber aggregates which are the constituent materials of the inorganic fiber aggregates prior to the forming thereof, it becomes easier for the catalyst to be adhered thereto in a more evenly dispersed state. Since the sheet-shaped inorganic fiber aggregates are laminated in the longitudinal direction, it becomes possible for the laminating to be carried out, while the dispersion degree of the catalyst in the longitudinal direction and the kind of catalyst are freely combined in accordance with the intended purpose of the honeycomb structure. Consequently, in the honeycomb structure according to the embodiments of the present invention, it becomes easier to improve its carrying out of regenerating and toxic gas purifying and/or converting function.

Moreover, in the honeycomb structure according to the embodiments of the present invention, by alternately laminating inorganic fiber aggregates having mutually different sizes of through holes, or by randomly laminating those aggregates, it becomes possible to form irregularities on the surface of each wall portion of the honeycomb structure easily. The formation of such irregularities on the surface of each wall portion presumably makes it possible to increase the filtering area, and consequently makes it easier to reduce a pressure loss at the time of capturing particulates. Moreover, the irregularities allow the exhaust gas flow to form a turbulent flow, making it possible to reduce the temperature difference in the filter and consequently making it easier to prevent damages such as cracks due to thermal stress.

Figure 3A:
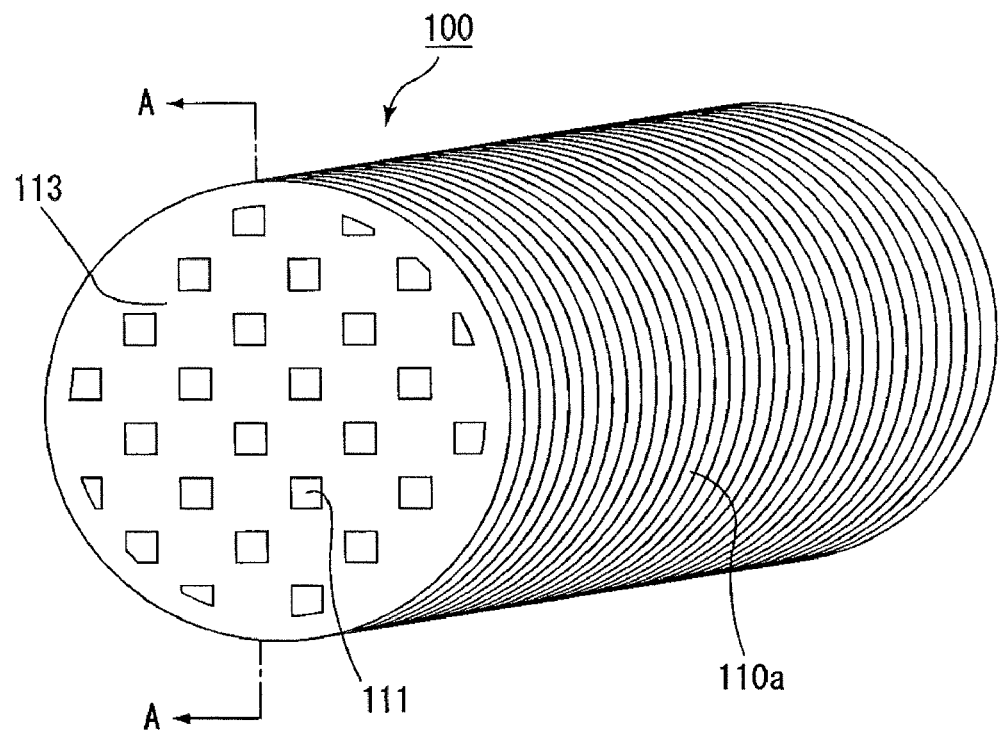
FIG. 3A is a perspective view that schematically shows a specific example of a honeycomb structure according to an embodiment of the present invention.

With reference to the drawings, the honeycomb structure according to the embodiments of the present invention will be explained below. FIG. 3A is a perspective view that schematically shows a specific example of a honeycomb structure according to an embodiment of the present invention, and FIG. 3B is a cross-sectional view taken along line A-A of FIG. 3A.

A honeycomb structure 100 has a cylindrical shape in which a number of through holes 111 with either end being sealed are placed in parallel with one another in the longitudinal direction with a wall portion 113 therebetween. In other words, as shown in FIG. 3B, either end of a bottomed hole 111 corresponding to the inlet side or the outlet side of exhaust gases is sealed so that the exhaust gases that have flowed into one of the bottomed holes 111 are allowed to flow out of another bottomed hole 111 after passing through the wall portion 113 that separates the bottomed hole 111, and thus the wall portion 113 functions as a filter.

Figure 3B:
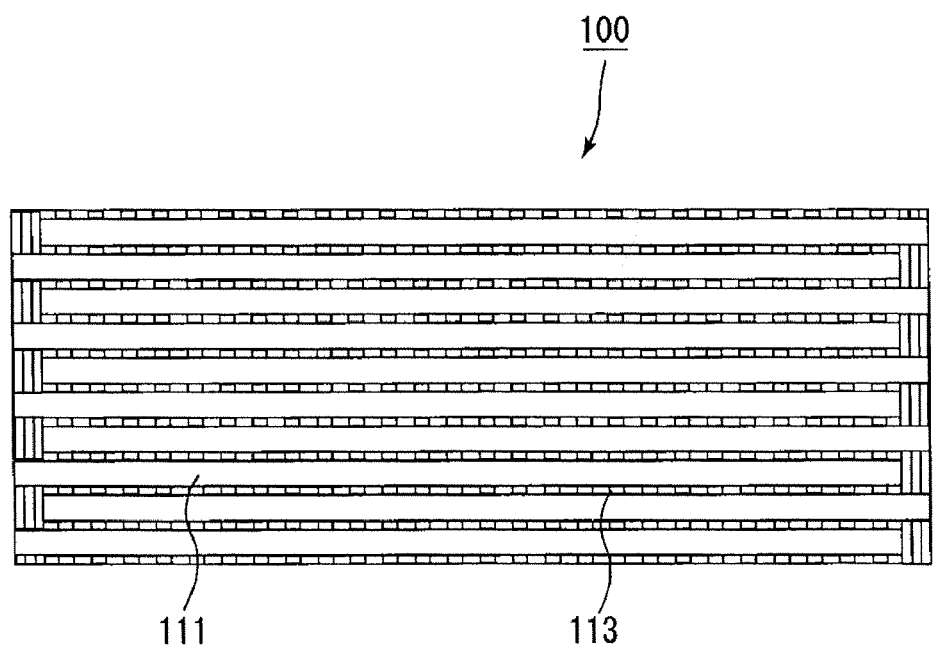
FIG. 3B is a cross-sectional view taken along line A-A of FIG. 3A.

The honeycomb structure according to the embodiments of the present invention is, as shown in FIGS. 3A and 3B, a laminated body formed by laminating a sheet-shaped inorganic fiber aggregate 110a having a thickness of at least about 0.1 mm and at most about 20 mm, in which the inorganic fiber aggregates 110a are laminated in such a manner that the through holes 111 (element through holes) are superposed on one another in the longitudinal direction. Here, the expression "the inorganic fiber aggregates are laminated in such a manner that the through holes are superposed on one another" refers to the configuration where through holes formed in the adjacent inorganic fiber aggregates are allowed to communicate with each other.

The respective inorganic fiber aggregates may be bonded to each other by using an inorganic adhesive or the like, or may be simply laminated physically; and it is more desirable for the inorganic fiber aggregates to be simply laminated physically. When the inorganic fiber aggregates are simply laminated physically, the flow of exhaust gases is less likely to be blocked by a joining portion composed of the adhesive or the like, and consequently the pressure loss is less likely to become high. Here, in the case of the structure in which the respective inorganic fiber aggregates are simply laminated physically, a laminated body is formed by laminating the inorganic fiber aggregates in a casing (a can-type metal body) to be attached to an exhaust pipe, and a pressure is applied thereto.

In the honeycomb structure according to the embodiments of the present invention, desirably, plate members (hereinafter, referred to also as metal plates), mainly made of metal, are laminated on each end of a laminate of the inorganic fiber aggregates. The formation of the metal plates on the both ends of the inorganic fiber aggregates makes the honeycomb structure less likely to be subjected to erosion.

Moreover, it also becomes easier to prevent a gap from the casing (metal container) and a gap between the mutual inorganic fiber aggregates from being formed at high temperatures (in use) due to a difference in the thermal expansions from the casing (metal container), and consequently to prevent particulates in exhaust gases from leaking and causing a reduction in the capture efficiency of particulates. Moreover, since the strength in the end faces is increased, it becomes easier to prevent damages in the filter from occurring due to a pressure or the like of exhaust gases imposed on the end faces in use. In this case, for example, a metal plate may be used for only the portion at which one of the ends of a through hole is sealed.

With respect to the material for the metal plate, not particularly limited, for example, chrome-based stainless steel and chrome-nickel-based stainless steel may be used. Here, through holes need to be formed at predetermined positions of the metal plate.

In the honeycomb structure according to the embodiments of the present invention, an inorganic fiber aggregate 110a on which a catalyst is supported is desirably used. When the catalyst capable of converting toxic gas components in exhaust gases such as CO, HC and NOx is supported on the honeycomb structure according to the embodiments of the present invention, it becomes possible to sufficiently convert the toxic gas components in exhaust gases through the catalyst reaction so that the reaction heat, generated in the catalyst reaction, is more easily utilized for burning and eliminating the particulates adhered to the wall portions 113. Moreover, by supporting a catalyst that helps to burn the particulates, it becomes possible for the particulates to be burned and eliminated more easily. As a result, the honeycomb structure according to the embodiments of the present invention makes it easier to improve its purifying function for exhaust gases and to reduce energy required for burning the particulates.

With respect to the embodiments of the inorganic fiber aggregate on which a catalyst is supported, the description thereof has been given above.

The catalyst may be supported on all the inorganic fiber aggregates, or may be supported on only part of the inorganic fiber aggregates. For example, if the porosity of each of the inorganic fiber aggregates is altered depending on the material of each inorganic fiber aggregate, the catalyst may be supported only on the inorganic fiber aggregate that is made to have a high porosity. In this manner, in the honeycomb structure according to the embodiments of the present invention, it is easy to alter the amount of the supported catalyst in the longitudinal direction and the kind of the catalyst freely in accordance with the intended purpose, and consequently, the honeycomb structure according to the embodiments of the present invention makes it easier to improve its regenerating function and toxic gas purifying and/or converting function. Here, in the above-mentioned honeycomb structure, the amount of the supported catalyst is desirably at least about 0.01 g and at most about 1 g per 10 g of the inorganic fibers.

Since the catalyst is supported thereon in this manner, it becomes possible to allow the honeycomb structure according to the embodiments of the present invention to function as a filter for capturing particulates in exhaust gases, and also to function as a catalyst supporting carrier used for converting CO, HC and NOx contained in the exhaust gases. Here, the honeycomb structure according to the embodiments of the present invention in which the catalyst is supported is allowed to function as a gas purifying device in the same manner as the conventionally known DPFs (Diesel Particulate Filters) with catalyst. Therefore, the detailed explanation of functions of the honeycomb structure according to the embodiments of the present invention serving as the catalyst supporting carrier is omitted.

The desirable porosity of one whole honeycomb structure according to the embodiments of the present invention is the same with the desirable porosity of the above-mentioned inorganic fiber aggregate according to the embodiments of the present invention.

With respect to the thickness of the wall portion, although not particularly limited, the lower limit value is desirably set to about 0.2 mm and the upper limit value is desirably set to about 10.0 mm. The thickness of the wall portion of about 0.2 mm or more is less likely to reduce the strength, while the thickness of the wall portion of about 10.0 mm or less is less likely to make the pressure loss become high. More desirably, the lower limit value is set to about 0.3 mm and the upper limit value is set to about 6.0 mm.

With respect to the density of the through hole on the cross section perpendicular to the longitudinal direction of the honeycomb structure according to the embodiments of the present invention, although not particularly limited, the lower limit value thereof is desirably set to about 0.16 hole/cm$^2$ (about 1.0 hole/in$^2$), and the upper limit value thereof is desirably set to about 62 holes/cm$^2$ (about 400 holes/in$^2$). The density of about 0.16 hole/cm$^2$ or more is less likely to reduce the filtering area, while the density of about 62 holes/cm$^2$ or less prevents the pressure loss from becoming too high. The lower limit value of the density of the through hole is more desirably set to about 0.62 hole/cm$^2$ (about 4.0 holes/in$^2$), and the upper limit value thereof is more desirably set to about 31 holes/cm$^2$ (about 200 holes/in$^2$).

With respect to the size of the through hole on the cross section perpendicular to the longitudinal direction of the honeycomb structure according to the embodiments of the present invention, although not particularly limited, the lower limit value thereof is desirably set to about 0.8 mm×about 0.8 mm, and the upper limit value thereof is desirably set to about 16 mm×about 16 mm.

Moreover, when sheet-shaped inorganic fiber aggregates having different through hole sizes are used and laminated one after another, irregularities are formed on the inner surface of each through hole so that the filtering area becomes greater more easily and thus it is considered that the pressure loss upon capturing particles may be reduced more easily. Moreover, since the irregularities make the flow of exhaust gases to a turbulent flow more easily, it is considered that the temperature difference in the filter may be made smaller more easily and thus it becomes easier to effectively prevent damages due to a thermal stress. The shape of the through hole on the plan view is not particularly limited to a quadrangular shape, and any desired shape, such as a triangle, a hexagon, an octagon, a dodecagon, a round shape and an elliptical shape, may be used.

Although the shape of the honeycomb structure shown in FIG. 3A has a cylindrical shape, the shape of the honeycomb structure of the present invention is not particularly limited to a cylindrical shape, and any pillar shape such as a cylindroid shape, a rectangular pillar shape or the like with any size, may be used.

Figure 4A:
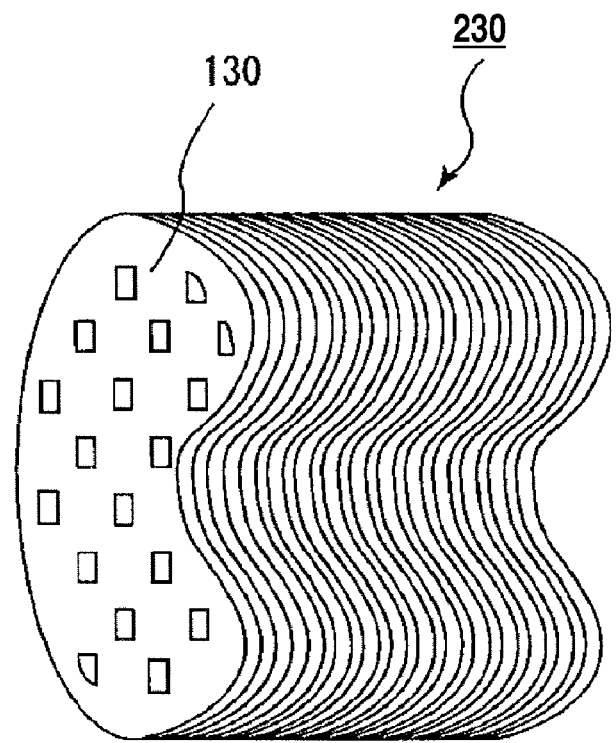
FIG. 4A is a perspective view that schematically shows another example of the honeycomb structure according to an embodiment of the present invention.
Figure 4B:
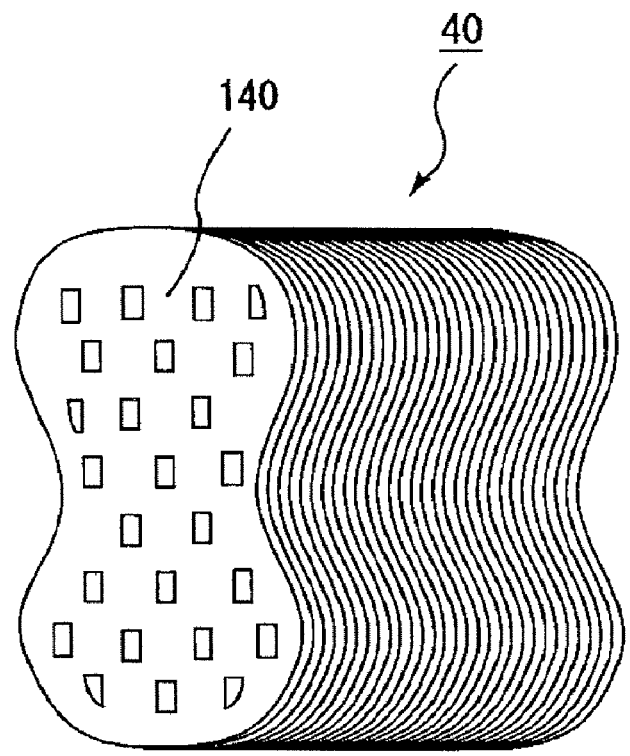
FIG. 4B is a perspective view that schematically shows still another example of the honeycomb structure according to an embodiment of the present invention.

FIG. 4A is a perspective view that schematically shows another example of the honeycomb structure according to an embodiment of the present invention, and FIG. 4B is a perspective view that schematically shows still another example of the honeycomb structure according to an embodiment of the present invention.

If the filter is installed right below the engine, the filter space is extremely limited, and a complex filter shape is sometimes required. However, in the honeycomb structure according to the embodiments of the present invention, even a complex shape, such as a filter 230 with a concave portion on one side as shown in FIG. 4A and a filter 40 with concave portions on two sides as shown in FIG. 4B, is possible to be easily achieved by laminating the inorganic fiber aggregates 130 and 140 in the longitudinal direction. Moreover, since the honeycomb structure according to the embodiments of the present invention is formed by laminating the inorganic fiber aggregates in the longitudinal direction, even a curved shape in the longitudinal direction and a deformed shape that is gradually changed in the longitudinal direction little by little is possible to be easily achieved. The honeycomb structure according to the embodiments of the present invention having such a structure can be formed by using a method for manufacturing a honeycomb structure according to the embodiments of the present invention, which will be described later.

The following description will explain the method for manufacturing a honeycomb structure according to the embodiments of the present invention. The method for manufacturing a honeycomb structure according to the embodiments of the present invention includes: mixing inorganic fibers A with inorganic fibers B and/or inorganic particles C that melt at a temperature at which the inorganic fibers A are neither melted nor sublimated to prepare a mixture; then forming the mixture into a sheet-shaped mixture; forming through holes in the sheet-shaped mixture at the same time with preparation of the sheet-shaped mixture or after preparation of the sheet-shaped mixture; heating the sheet-shaped mixture with the through holes formed therein at a temperature below a heat resistant temperature of the inorganic fibers A and above a softening temperature of the inorganic fibers B and/or the inorganic particles C so that a sheet-shaped inorganic fiber aggregate is manufactured; and laminating the inorganic fiber aggregates such that the through holes formed therein are superposed on one another.

Figure 5A:
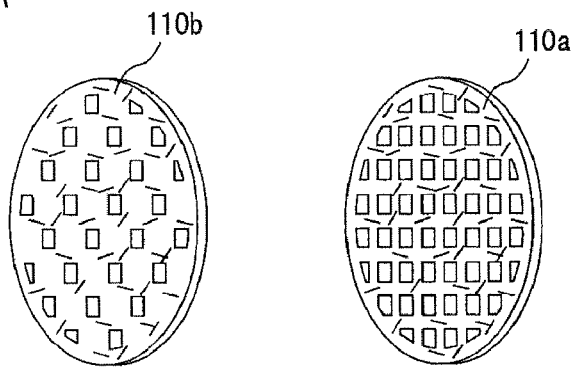
FIG. 5A is a perspective view that shows a sheet-shaped inorganic fiber aggregate constituting a honeycomb structure according to the embodiments of the present invention.
Figure 5B:
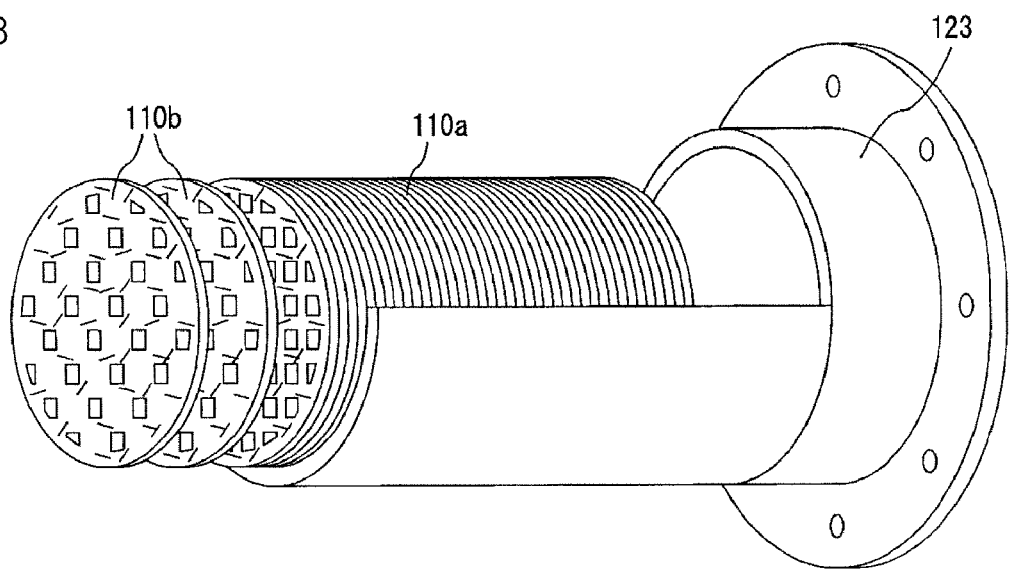
FIG. 5B is a perspective view that shows a state in which the sheet-shaped inorganic fiber aggregates shown in FIG. 5A are laminated to manufacture the honeycomb structure.

Referring to FIGS. 5A and 5B, the following description will discuss one example of a method for manufacturing a honeycomb structure according to the embodiments of the present invention. FIGS. 5A and 5B are perspective views that explain the method for manufacturing a honeycomb structure according to an embodiment of the present invention.

(1) First, after inorganic fibers A have been mixed with the inorganic fibers B and/or inorganic particles C that melt at a temperature at which the inorganic fibers A are neither melted nor sublimated, the mixture is formed into a sheet shape; that is, preparing a sheet-shaped mixture is carried out.

In this process, a mixture is prepared by mixing the inorganic fibers A with the inorganic fibers B and/or the inorganic particles C by using the same method as the method explained in the method for manufacturing an inorganic fiber aggregate according to embodiments of the present invention, and the resulting mixture is formed into a sheet shape through sheet-forming and fiber laminating explained in the method for manufacturing an inorganic fiber aggregate according to embodiments of the present invention.

(2) Next, forming of through holes in the sheet-shaped mixture is carried out. More specifically, through holes having desired shapes can be formed at predetermined positions by using, for example, a stamping process. Moreover, in the sheet-forming in the above-mentioned (1), by using a mesh in which holes having predetermined shapes are formed in a checkered pattern or a mesh in which holes are formed at portions corresponding to the through holes, a sheet-shaped mixture in which through holes are formed can be obtained.

(3) Next, the heating at a temperature below the heat resistant temperature of the inorganic fibers A and above the softening temperature of the inorganic fibers B and/or the inorganic particles C is carried out on the sheet-shaped mixture having through holes formed therein so that a sheet-shaped inorganic fiber aggregate is manufactured. Here, with respect to the heating, the same method as that of the heating used in the method for manufacturing the inorganic fiber aggregate according to the embodiments of the present invention may be adopted.

Moreover, after the sheet-shaped inorganic fiber aggregate has been manufactured through the above-mentioned heating, an acid treatment or quenching treatment may be carried out on the sheet-shaped inorganic fibers, if necessary.

(4) Thereafter, the resulting sheet-shaped inorganic fiber aggregates are laminated so that the through holes are superposed on one another so that a honeycomb structure can be manufactured. More specifically, as shown in FIG. 5B, by using a cylinder-shaped casing 123 having a pressing metal member on one side, after several sheet-shaped inorganic fiber aggregates 110b for both end portions have been laminated inside the casing 123, a predetermined number of sheet-shaped inorganic fiber aggregates 110a for the inside are laminated therein. Then, several sheet-shaped inorganic fiber aggregates 110b for both end portions are lastly laminated, and after having been pressed, another pressing metal member is also put on the other side and secured thereon so that a honeycomb structure that has been treated to a canning is manufactured.

Here, for example, in place of the sheet-shaped inorganic fiber aggregates for both end portions, metal plates having through holes at predetermined positions may be laminated. Thus, laminating in which the sheet-shaped inorganic fiber aggregates are laminated, with plate members mainly made of metal being laminated on the both ends thereof, is carried out, so that a honeycomb structure in which the plate members mainly made of metal are laminated on each end of a laminate of the inorganic fiber aggregates can be manufactured.

If the honeycomb structure according to the embodiments of the present invention has a structure in which sheet-shaped inorganic fiber aggregates are simply laminated physically in this manner, even if a certain degree of temperature distribution occurs in a honeycomb structure, after this honeycomb structure has been placed in an exhaust passage, the temperature distribution per one sheet-shaped inorganic fiber aggregate tends to become small so that cracks and the like are less likely to occur.

Furthermore, if sheet-shaped inorganic fiber aggregates, which have different dimensions in the through holes, are manufactured and laminated, the bottomed holes are allowed to form irregularities; thus, it becomes possible to form bottomed holes having a larger surface area. With respect to the shape of the through holes, not particularly limited to a square shape, any desired shape, such as a triangle, a hexagon, an octagon, a dodecagon, a round shape and an elliptical shape, may be used.

Figure 6:
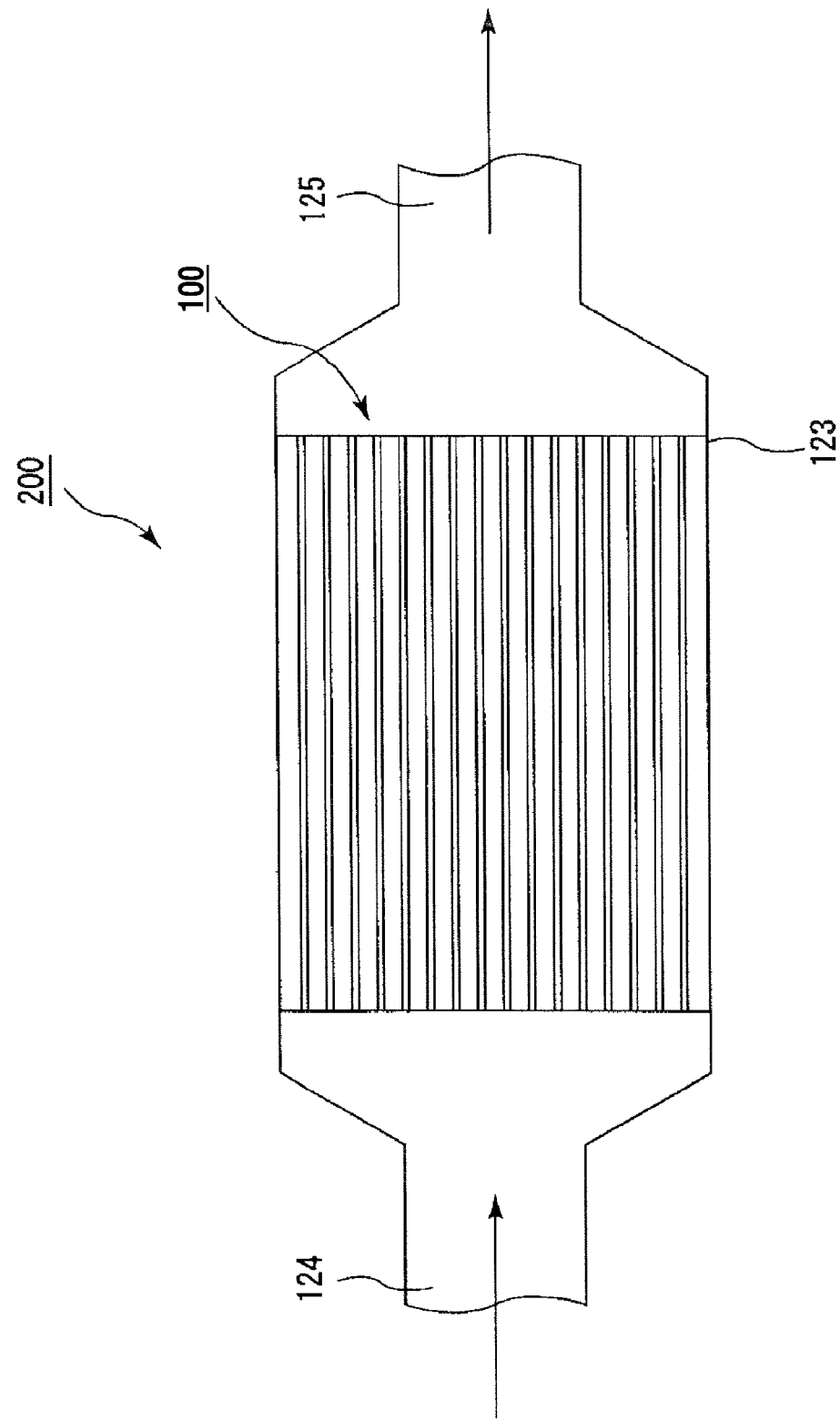
FIG. 6 is a cross-sectional view that schematically shows one example of an exhaust gas purifying device for a vehicle in which the honeycomb structure according to the embodiments of the present invention is installed.
Figure 7A:
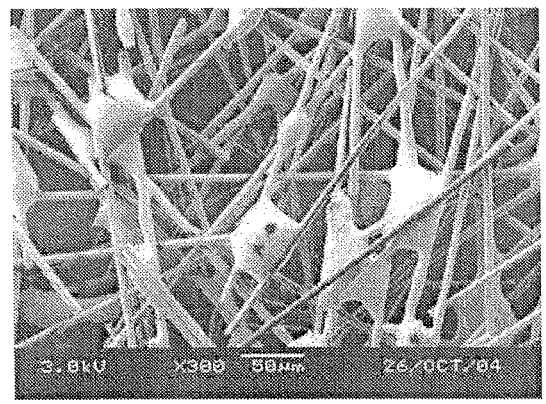
FIGS. 7A and 7B are SEM photographs of the inorganic fiber aggregate according to Example 1.
Figure 7B:
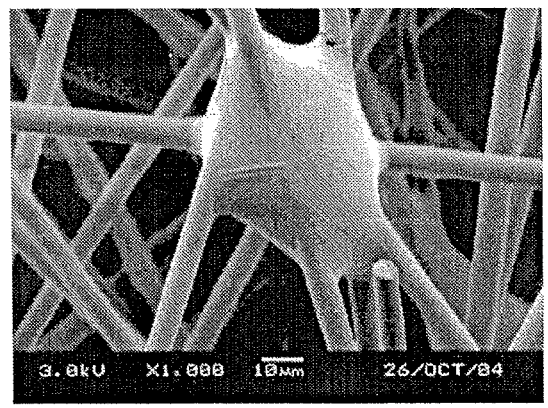
Figure 8:
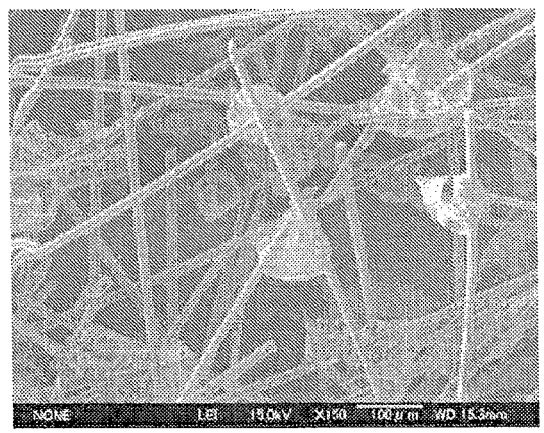
FIG. 8 is a SEM photograph (magnification: ×150) of the inorganic fiber aggregate according to Example 10.
Figure 9:
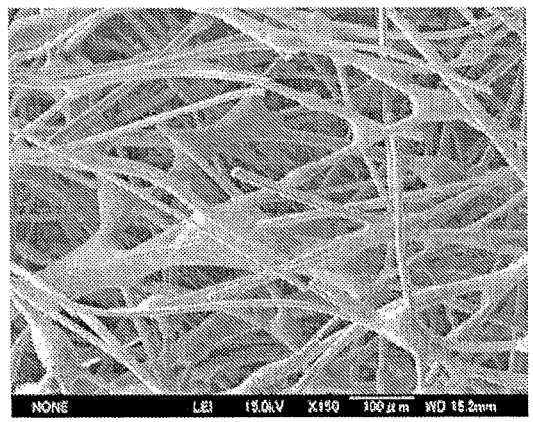
FIG. 9 is a SEM photograph (magnification: ×150) of the inorganic fiber aggregate according to Example 11.
Figure 10A:
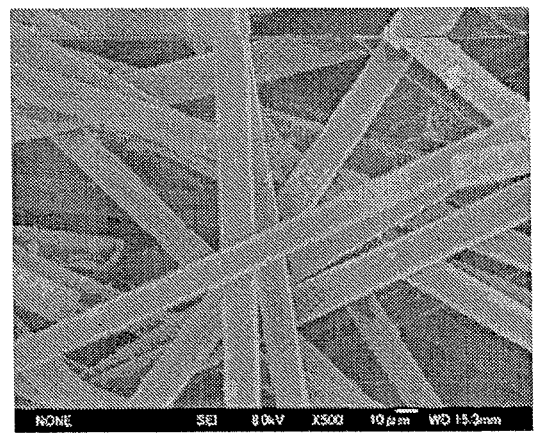
FIGS. 10A and 10B are SEM photographs of the inorganic fiber aggregate according to Comparative Example 1.
Figure 10B:
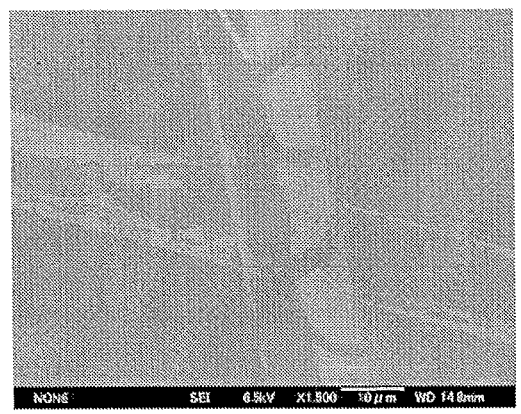
Figure 11:
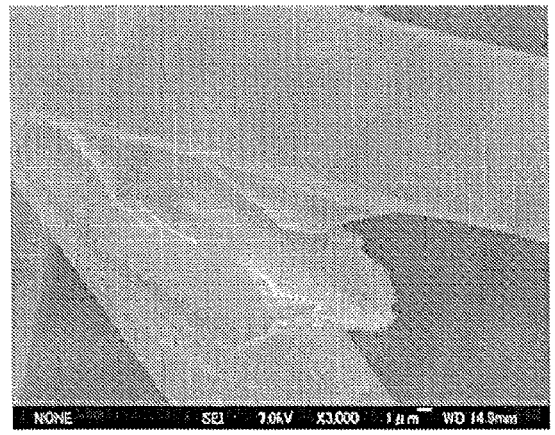
FIG. 11 is a SEM photograph (magnification: ×3000) of the inorganic fiber aggregate according to Comparative Example 2.
Figure 12A:
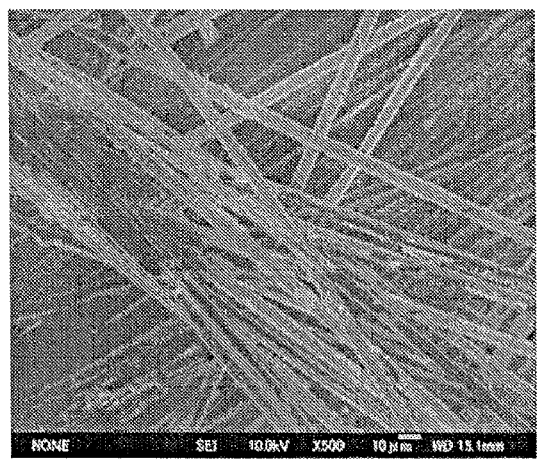
FIGS. 12A and 12B are SEM photographs of the inorganic fiber aggregate according to Example 3.
Figure 12B:
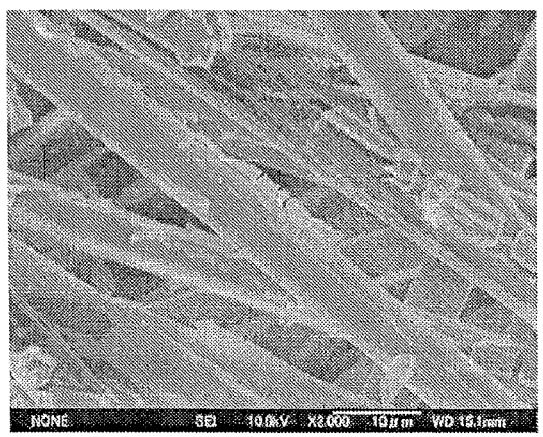

Although the use of the honeycomb structure according to the embodiments of the present invention is not particularly limited, it is desirably applied to, for example, an exhaust gas purifying device for a vehicle. FIG. 6 is a cross-sectional view that schematically shows one example of an exhaust gas purifying device for a vehicle in which the honeycomb structure according to an embodiment of the present invention is installed.

As shown in FIG. 6, an exhaust gas purifying device 200 is mainly configured by a honeycomb structure 100 according to one embodiment of the present invention; a casing 123 that covers the outside of the honeycomb structure 100; an introducing pipe 124 which is coupled to an internal combustion system such as an engine and is connected to the end portion of the casing 123 on the side to which exhaust gases are introduced; and an exhaust pipe 125 coupled to the outside is connected to the other end portion of the casing 123. In FIG. 6, arrows indicate flows of exhaust gases.

In the exhaust gas purifying device 200 having the above-mentioned configuration, exhaust gases, discharged from an internal combustion system such as an engine, are introduced into the casing 123 through the introducing pipe 124, and allowed to pass through a wall portion (partition wall) from the through hole of the honeycomb structure 100 so that, after particulates therein have been captured by this wall portion (partition wall) to purify the exhaust gases, the resulting exhaust gases are discharged outside through the exhaust pipe 125.

In addition, when large amount of particles accumulate on the surface of the wall portion (partition wall) of the honeycomb structure 100, and as a result the pressure loss becomes high, regenerating on the honeycomb structure 100 is carried out by a prescribed means such as post-injection.

According to the inorganic fiber aggregate according to the embodiments of the present invention, an inorganic material sticks firmly to a portion at the surface of an inorganic fiber, and the inorganic fibers are firmly fixed to each other through the inorganic material so that it is likely to exhibit an excellent strength. Moreover, in the embodiments of the above-mentioned inorganic fiber aggregate, since the inorganic fibers are firmly fixed to each other through the inorganic material, it becomes possible to prevent loose inorganic fibers, and also to make the inorganic fiber aggregate hardly subjected to erosion.

According to the method for manufacturing an inorganic fiber aggregate according to the embodiments of the present invention, by using the above-mentioned processes, it becomes possible to manufacture the inorganic fiber aggregate according to the embodiments of the present invention appropriately. In particular, since the portion where the inorganic fibers are firmly fixed to each other corresponds to an intersection of the inorganic fibers, it becomes possible to manufacture the inorganic fiber aggregate appropriately with a structure that the inorganic material is locally present at the intersection of the inorganic fibers.

The honeycomb structure according to the embodiments of the present invention, which is formed by using the inorganic fiber aggregates according to the embodiments of the present invention, is easily allowed to exert a sufficient strength when used as a filter for purifying exhaust gases containing particulates and the like, and further prevents loose inorganic fibers due to exhaust gases flowing into the honeycomb structure, as well as preventing the honeycomb structure from being subjected to erosion, thereby exhibiting excellent reliability.

Moreover, in the method for manufacturing the honeycomb structure according to the embodiments of the present invention, it becomes possible to appropriately manufacture the honeycomb structure according to the embodiments of the present invention by using the above-mentioned processes.

EXAMPLES

The following description will discuss the present invention in detail by means of examples, but the present invention is not limited by these examples.

Example 1

(1) Preparation of Sheet-forming Slurry

First, alumina fibers (50 parts by weight), glass fibers (average fiber diameter: 9 μm, average fiber length: 3 mm) (50 parts by weight) and an organic binder (polyvinyl alcohol based fibers) (10 parts by weight) were dispersed in a sufficient amount of water, and this was sufficiently stirred to prepare a sheet-forming slurry.

(2) Sheet-forming and Through Hole Forming

The slurry obtained in the process (1) was formed into a sheet by using a mesh having a diameter of 143.8 mm, and the resulting material was dried at 135° C. so that a sheet-shaped mixture having a thickness of 1 mm was obtained. Next, a stamping process was carried out on the resulting mixture so that through holes of 4.5 mm×4.5 mm were formed at 2 mm intervals over almost the entire face of the sheet-shaped mixture.

(3) Heating Treatment

Heating treatment at 950° C. was carried out on the sheet-shaped mixture obtained in the process (2) for one hour so that a sheet-shaped inorganic fiber aggregate was obtained.

(4) Acid Treatment and Quenching Treatment

The sheet-shaped inorganic fiber aggregate obtained in the process (3) was immersed in 4 mol/L of a HCl solution at 90° C. for one hour so as to carry out an acid treatment thereon, and then a quenching treatment was carried out at 1050° C. for 5 hours. The porosity and the like of the sheet-shaped inorganic fiber aggregate obtained in the processes (1) to (4) are as shown in Table 2.

(5) Preparation of metal plates for both end portions After a Ni—Cr alloy metal plate had been machined into a disc shape of 143.8 mm in diameter×1 mm in thickness, a laser machining process was further carried out on the resulting plate so that a metal lamination member in which holes of 4.5 mm×4.5 mm were formed with a checkered pattern was manufactured. Two plates of the metal lamination member were manufactured by this process in such a manner that the locations of holes formed therein were different from each other, thereby, after laminating the metal lamination members in the below-mentioned laminating, a resulting honeycomb structure has a configuration in which the sealed parts in the inlet side end face and outlet side end face are different.

(6) Laminating

First, in a separated process, a casing (a can-type metal container) to which a pressing metal member was attached to one side thereof was placed, with the side bearing the pressing metal member attached thereto facing down. After one of the metal lamination members obtained in the process (5) had been laminated, 83 sheets of the sheet-shaped inorganic fiber aggregates obtained in the process (4) were laminated thereon, and lastly, one of the metal lamination members was laminated thereon, and pressing was further carried out on the resulting product. Then, another pressing metal member was also placed on the other side and secured thereon so that a honeycomb structure having a laminated body with a length of 75 mm was manufactured.

In this process, the sheet-shaped inorganic fiber aggregates were laminated one after another in such a manner that all the through holes formed in each sheet superpose with those corresponding holes formed in the adjacent sheet, and furthermore, the metal lamination members were laminated in such a manner that the sealed parts in the inlet side end face and outlet side end face of the honeycomb structure were different (i.e. only one end of the overlapped through holes was sealed).

Examples 2 to 5

The same processes as those in Example 1 were carried out, except that the shapes of inorganic fibers A (alumina fibers) and inorganic fibers B (glass fibers) were changed to those shown in Table 1, so that a honeycomb structure was obtained.

Examples 6 and 7

The same processes as those in Example 1 were carried out, except that the inorganic particles C (glass particles) were used in place of the inorganic fibers B (glass fibers), so that a honeycomb structure was obtained.

Examples 8 to 13

The same processes as those in Example 1 were carried out, except that the inorganic fibers shown in Table 1 were used as the inorganic fibers A in place of the alumina fibers, so that a honeycomb structure was obtained.

Examples 14 and 15

The same processes as those in Example 1 were carried out, except that the compounding amount of the inorganic fibers A (alumina fibers) and the inorganic fibers B (glass fibers) were set to the amount shown in Table 1, so that a honeycomb structure was obtained.

Comparative Example 1

(1) Preparation of Sheet-forming Slurry

Alumina fibers (90 parts by weight) were dispersed in a sufficient amount of water, and 10 parts by weight of silica sol and 2.7 parts by weight of acrylic latex as organic binder were added thereto. Further, aluminum sulfate as a coagulant and polyacrylamide as a flocculent, both in a small amount, were added, and sufficiently stirred to prepare a sheet-forming slurry.

(2) Sheet-forming

The slurry obtained in the process (1) was formed into a sheet by using a mesh having a diameter of 143.8 mm, and the resulting product was dried at 150° C., and then a stamping process was carried out thereon as in the process (2) in Example 1 to obtain a sheet-shaped inorganic fiber aggregate having a thickness of 1 mm in which through holes of 4.5 mm×4.5 mm were formed over the entire face at 2 mm intervals. The porosity and the like of the sheet-shaped inorganic fiber aggregate are shown in Table 2.

(3) Laminating

A casing (a can-type metal container) to one side of which a pressing metal member was attached was placed with the side bearing the metal member attached thereto facing down. In the same manner as in Example 1, after laminating one of the metal lamination members, 83 sheets of the sheet-shaped inorganic fiber aggregates were laminated thereon, and lastly, one of the metal lamination members was laminated thereon. A pressing process was further carried out on the resulting product, and then another pressing metal member was also placed on the other side and secured thereon so that a honeycomb structure comprising a laminated body with a length of 75 mm was obtained. The metal lamination members were laminated in such a manner that the sealed parts in the inlet side end face and outlet side end face of the honeycomb structure were different (i.e. only one end of the overlapped through holes was sealed).

Comparative Example 2

A honeycomb structure was obtained in the same manner as in Comparative Example 1, except that a SiC fiber having the size shown in Table 1 was used in place of alumina fibers in process (1) of Comparative Example 1 and polyorganosilane was used in place of silica sol in process (2) of Comparative Example 1.

Comparative Example 3

(1) Alumina fibers (90 parts by weight) was added to 2.7 parts by weight of acrylic latex as organic binder and a sufficient amount of water to disperse the alumina fibers, and sheet-forming and a stamping process were carried out on the resulting alumina fiber-dispersion solution in the same manner as in the process (2) of Comparative Example 1 to obtain an alumina-fiber sheet.

(2) Next, the alumina-fiber sheet, obtained in the above-mentioned process (1), was immersed in an alcohol solution of iron nitrate (concentration: 0.5 mol/L), and the alumina fiber sheet was then taken out, and dried to prepare a sheet-shaped inorganic fiber aggregate.

(3) Next, by using the same method as the process (4) of Comparative Example 1, the metal lamination members and the sheet-shaped inorganic fiber aggregates were laminated on each other to obtain a honeycomb structure.

(Evaluation Method)

(1) Porosity of Honeycomb Structure

The porosity of the sheet-shaped inorganic fiber aggregate was measured by using a weighing method. In other words, a sample of the sheet-shaped inorganic fiber aggregate (10 mm×10 mm×1 mm) was cut out, and two times of an ultrasonic washing process (for 5 minutes) was carried out on the sample by using ion exchange water. Next, an ultrasonic washing process (for 5 minutes) was carried out for one time on the resulting product by using acetone, and dried at 100° C. for 5 hours, and the weight a (g) was measured by using an electronic scale. Next, the volume of only the base member (wall) portion of the inorganic fiber aggregate was calculated through measurements on the wall thickness of longitudinal one row and lateral one row in the center, the cell width and the height by using an optical microscope to find the volume b ($cm^3$) so that the bulk density c ($g/cm^3$) of only the base member portion of the inorganic fiber aggregate was found based upon a/b. Successively, the inorganic fiber aggregate was pulverized into powder (volume: 23.6 cc), and dried at 200° C. for 8 hours, and the degree of vacuum was measured for an exhausting time of 40 minutes by using an AutoPycnometer 1320 (made by Micromeritics, Inc.) in compliance with JIS-R-1620 (1995); thus, the degree of vacuum d ($g/cm^3$) was found, and by substituting the measured value to an expression of $(1-c/d) \times 100$ (%), the porosity (%) was calculated. Table 2 shows the results. The contents of JIS-R-1620 (1995) are incorporated herein by reference in their entirety.

(2) Pore Diameter of Honeycomb Structure

The pore diameter of the honeycomb structure was measured by using a mercury porosimeter. In other words, a sample of the sheet-shaped inorganic fiber aggregate (10 mm×10 mm×1 mm) was cut out, and two times of an ultrasonic washing process (for 5 minutes) was carried out on the sample by using ion exchange water. Next, an ultrasonic washing process (for 5 minutes) for one time was carried out on the resulting product by using acetone, and dried at 100° C. for 5 hours. Next, the pore diameter of the result was measured by using an automatic porosimeter (AutoPore III9405, made by Shimadzu Corp.) in a range of 0.2 μm to 500 μm, in compliance with JIS-R-1655. In this case, the measurements were carried out for every 0.1 psia in the range of 100 μm to 500 μm, as well as for every 0.25 psia in the range of 0.2 μm to 100 μm, and the average pore diameter was obtained from the results of the measurements. Table 2 shows the results. The contents of JIS-R-1655 are incorporated herein by reference in their entirety.

(3) Tensile Strength of Inorganic Fiber Aggregate

In the same method as the method according to the respective Examples and Comparative Examples, a sheet-shaped inorganic fiber aggregate without through holes formed therein and having a size of 34 mm×34 mm×1 mm was manufactured separately, and with respect to this inorganic fiber aggregate, both of the ends thereof were secured by jigs, and the tensile strength was measured by using an Instron-type universal tester (5582, made by Instron Corp.). Table 2 shows the results.

(4) Observation on the Shape of Inorganic Fiber Aggregate

Each of the same inorganic fiber aggregates as the inorganic fiber aggregates that had been measured by the tensile strength measurements in the above-mentioned evaluation (3) was observed by an SEM (magnification: ×150 to ×3000). With respect to the inorganic material or the like used for firmly fixing the inorganic fibers to each other, if most of the inorganic material existed locally at the intersection of the inorganic fibers, this state was evaluated as "existing locally", and if the inorganic material was expanded over the entire inorganic fibers, this state was evaluated as "coated". Table 2 shows the results. Moreover, SEM observation photographs of the inorganic fiber aggregates according to Examples 1, 10 and 11 as well as Comparative Examples 1 to 3 are shown in FIGS. 7 to 12.

(5) Presence or Absence of Erosion

An air flow at 700° C. was continuously applied to each of the honeycomb structured bodies according to Examples and Comparative Examples at a flow rate 3 m/sec for one hour, and the weights of the honeycomb structure before and after applying the air flow were measured, and those having a weight reduction of 1% or more were evaluated as "erosion present" while those having a weight reduction of less than 1% were evaluated as "erosion absent". Table 2 shows the results.

(6) Measurements on Sound Absorbency

In compliance with JIS-A-1405, the sound absorbency in a range of 100 Hz to 2000 Hz was measured on measuring samples manufactured through the following method. The same processes as those of the respective Examples and Comparative Examples were carried out except that, in Examples 1 to 15 and Comparative Examples 1 to 3, the diameter was changed to 100 mm so that lamination members (sheet-shaped inorganic fiber aggregates and metal lamination members) were manufactured, and these lamination members were laminated so that one metal lamination member was placed on each of the two ends, with 35 sheets of the sheet-shaped inorganic fiber aggregates being placed between the metal lamination members, and this laminated body was next secured into a cylinder (can-type) jig (metal tube: 100 mm in inner diameter, 102 mm in outer diameter and 35 mm in height) so that a measuring sample was manufactured. With respect to the results of measurements, Table 2 shows the sound absorbency at 400 Hz. Here, Table 2 also shows firing conditions in each of the Examples and the Comparative Examples. The contents of JIS-A-1405 are incorporated herein by reference in their entirety.

TABLE 1

| | Inorganic fibers A | | | | | Inorganic fibers B/inorganic particles C, etc. | | | | |
|---|---|---|---|---|---|---|---|---|---|---|
| | Kind | Fiber length (mm) | Fiber diameter (μm) | Melting point (°C.) | Heat resistant temperature (°C.) | Compounding amount (parts by weight) | Kind | Fiber length (mm) | Fiber diameter (μm) | Melting point (°C.) | Compounding amount (parts by weight) |
| Example 1 | Alumina fiber | 3 | 7 | 1800 | 1300 | 50 | Glass fiber | 3 | 9 | 850 | 50 |
| Example 2 | Alumina fiber | 0.5 | 3 | 1800 | 1300 | 50 | Glass fiber | 1 | 3 | 850 | 50 |
| Example 3 | Alumina fiber | 5 | 10 | 1800 | 1300 | 50 | Glass fiber | 3 | 12 | 850 | 50 |
| Example 4 | Alumina fiber | 3 | 7 | 1800 | 1300 | 80 | Glass fiber | 3 | 9 | 850 | 20 |
| Example 5 | Alumina fiber | 3 | 7 | 1800 | 1300 | 20 | Glass fiber | 3 | 9 | 850 | 80 |
| Example 6 | Alumina fiber | 3 | 7 | 1800 | 1300 | 50 | Glass powder | 20 μm (note 1) | | 850 | 50 |
| Example 7 | Alumina fiber | 3 | 7 | 1800 | 1300 | 50 | Glass powder | 80 μm (note 1) | | 850 | 50 |
| Example 8 | Silica fiber | 3 | 10 | 1400 | 1000 | 50 | Glass fiber | 3 | 9 | 850 | 50 |
| Example 9 | Silica-alumina fiber | 2 | 5 | 1600 | 1200 | 50 | Glass fiber | 3 | 9 | 850 | 50 |
| Example 10 | SiC fiber | 3 | 15 | 2000 | 1600 | 50 | Glass fiber | 3 | 9 | 850 | 50 |
| Example 11 | Basalt fiber | 6 | 9 | 1300 | 800 | 50 | Glass fiber | 3 | 9 | 850 | 50 |
| Example 12 | Potassium titanate fiber | 0.5 | 10 | 1300 | 1200 | 50 | Glass fiber | 3 | 9 | 850 | 50 |
| Example 13 | Zirconia fiber | 1.6 | 6 | 2600 | 2200 | 50 | Glass fiber | 3 | 9 | 850 | 50 |
| Example 14 | Alumina fiber | 3 | 7 | 1800 | 1300 | 85 | Glass fiber | 3 | 9 | 850 | 15 |
| Example 15 | Alumina fiber | 3 | 7 | 1800 | 1300 | 15 | Glass fiber | 3 | 9 | 850 | 85 |
| Comparative Example 1 | Alumina fiber | 3 | 7 | 1800 | 1300 | 90 | Silica sol | — | — | — | 10 |
| Comparative Example 2 | SiC fiber | 3 | 15 | 2000 | 1600 | 90 | polyorgano-silane | — | — | — | 10 |
| Comparative Example 3 | Alumina fiber | 3 | 7 | 1800 | 1300 | 90 | Iron nitrate | — | — | — | 10 |

(Note 1)
indicating particle diameter of inorganic particles (Note 2)
In the Table, each of the fiber length and the fiber diameter is indicated by the average value.

TABLE 2

| | Firing | | Inorganic fiber aggregate | | | | Honeycomb structure | |
| --- | --- | --- | --- | --- | --- | --- | --- | --- |
| | | | Pore | | | | Tensile | Sound |
| | Temperature (° C.) | Time (hr) | Porosity (%) | diameter (μm) | Thickness (mm) | State of inorganic material | strength (MPa) | State of erosion | absorbency (%) |
| Example 1 | 950 | 1 | 80 | 45 | 1 | Existing locally | 0.58 | Absent | 23 |
| Example 2 | 950 | 1 | 75 | 35 | 1 | Existing locally | 0.65 | Absent | 20 |
| Example 3 | 950 | 1 | 85 | 50 | 1 | Existing locally | 0.52 | Absent | 21 |
| Example 4 | 950 | 1 | 70 | 30 | 1 | Existing locally | 0.68 | Absent | 25 |
| Example 5 | 950 | 1 | 90 | 60 | 1 | Existing locally | 0.50 | Absent | 20 |
| Example 6 | 950 | 1 | 78 | 45 | 1 | Existing locally | 0.54 | Absent | 21 |
| Example 7 | 950 | 1 | 81 | 42 | 1 | Existing locally | 0.52 | Absent | 22 |
| Example 8 | 950 | 1 | 80 | 45 | 1 | Existing locally | 0.59 | Absent | 22 |
| Example 9 | 950 | 1 | 75 | 40 | 1 | Existing locally | 0.65 | Absent | 20 |
| Example 10 | 950 | 1 | 90 | 55 | 1 | Existing locally | 0.55 | Absent | 18 |
| Example 11 | 950 | 1 | 83 | 47 | 1 | Existing locally | 0.38 | Absent | 22 |
| Example 12 | 950 | 1 | 73 | 35 | 1 | Existing locally | 0.67 | Absent | 23 |
| Example 13 | 950 | 1 | 79 | 39 | 1 | Existing locally | 0.58 | Absent | 20 |
| Example 14 | 950 | 1 | 69 | 29 | 1 | Existing locally | 0.48 | Absent | 24 |
| Example 15 | 950 | 1 | 92 | 61 | 1 | Existing locally | 0.49 | Absent | 17 |
| Comparative Example 1 | — | | 80 | 40 | 1 | Coated | 0.25 | Present | 8 |
| Comparative Example 2 | — | | 85 | 50 | 1 | Coated | 0.18 | Present | 8 |
| Comparative Example 3 | 600 | 5 | 80 | 45 | 1 | Coated | 0.19 | Present | 7 |

(Note)
In the table, the pore diameter is indicated by the average value.

As clearly indicated by the results shown in Table 2, the inorganic fiber aggregates according to the respective Examples had a tensile strength of about 0.3 MPa or more, which was a high level, so that the honeycomb structured bodies using these inorganic fiber aggregates were not subjected to erosion. In contrast, the inorganic fiber aggregates according to the respective Comparative Examples had a tensile strength of about 0.25 MPa or less, which was a low level, with the result that the honeycomb structured bodies using these inorganic fiber aggregates were subjected to erosion.

Moreover, with respect to the inorganic fiber aggregates according to the respective Examples and Comparative Examples, when the results of SEM observation were compared, portions at which the inorganic fibers were firmly fixed to each other by the inorganic material corresponded to the intersection of the inorganic fibers, with the inorganic material existing locally at the intersection of the inorganic fibers, in the case of the inorganic fiber aggregates according to Examples; in contrast, silica sol, polyorganosilane and iron nitrate, used for firmly fixing the inorganic fibers to each other, were expanded in a manner so as to coat the entire inorganic fibers, in the case of the inorganic fiber aggregates according to the respective Comparative Examples (see FIGS. 7 to 12).

As clearly indicated by these results, the inorganic fiber aggregates according to the embodiment of the present invention have a high tensile strength, and the honeycomb structured bodies, manufactured by using these inorganic fiber aggregates, have a high tensile strength, and are free from the occurrence of erosion so that it is possible to use the honeycomb structured bodies appropriately as filters.

Moreover, when the honeycomb structured bodies (inorganic fiber aggregates) according to the respective Examples and Comparative Examples were compared with each other with respect to the sound absorbency, it was found that, as shown in Table 2, the honeycomb structured bodies according to the respective Examples had a superior absorbing rate in comparison with the honeycomb structured bodies according to the respective Comparative Examples. Here, although Table 2 only shows the results of measurements at 400 Hz, the same tendency was observed in the overall frequency bands (100 Hz to 2000 Hz) that had been measured.

Although the reason for these results obtained on the sound absorbency is not clearly verified, the following reason is considered. In other words, in the inorganic fiber aggregate, it is considered that the sound absorbing function is exerted by the fact that sound energy, directed to the inorganic fiber aggregate, is transmitted to the inside of the inorganic fiber aggregate to make the fibers and air rattle so that the energy is converted into thermal energy. Here, upon comparison with two cases, that is, the case like the inorganic fiber aggregates of Examples, in which the inorganic material used for firmly fixing the inorganic fiber aggregates to each other exists locally, and the case like the inorganic fiber aggregates of the respective Comparative Examples, in which the entire inorganic fiber aggregates are coated with the inorganic material, the inorganic fibers tend to be more easily warped and more easily rattled if the inorganic material exists locally; therefore, it is considered that the amount of energy to be converted from sound energy to thermal energy increases so that the inorganic fiber aggregates of the respective Examples exert a superior sound absorbing characteristic.

As described above, the honeycomb structure according to the embodiment of the present invention is superior in strength and resistance to erosion as a filter, and is also capable of absorbing noise in an internal combustion engine; therefore, it is possible to apply the honeycomb structure appropriately to an exhaust gas purifying device. In addition, when the honeycomb structure according to the embodiment of the present invention is used for the exhaust gas purifying device, the honeycomb structure exerts a strong bonding strength between the inorganic fiber aggregates (high tensile strength), and is less likely to be subjected to adverse effects caused by rattling, pressure of exhaust gases and the like (scattered inorganic fibers due to cracks and the like and deterioration in the fibers); therefore, the sound-absorbing effect is less likely to be deteriorated.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An inorganic fiber aggregate having a plurality of through holes formed therein comprising:
   inorganic fibers; and
   an inorganic material comprising glass that has a lower melting point than the inorganic fibers,
   wherein
   said inorganic fiber aggregate has the plurality of through holes passing therethrough and a wall portion that separates the plurality of through holes,
   a density of the plurality of through holes is at least about 0.16 holes/cm$^2$ and at most about 62 holes/cm$^2$,
   the inorganic material which melted is provided to fix the inorganic fibers to each other,
   the inorganic fibers are fixed to each other by the melted inorganic material at the intersections of the inorganic fibers,
   the inorganic material is locally provided at the intersections of the inorganic fibers, and
   at least about 20% of all of the intersections of the inorganic fibers are fixed to each other.

2. The inorganic fiber aggregate according to claim 1, wherein said inorganic material contains silica.

3. The inorganic fiber aggregate according to claim 1, wherein said inorganic fibers comprise at least one selected from the group consisting of silicon carbide, alumina, basalt, silica, silica alumina, titania and zirconia.

4. The inorganic fiber aggregate according to claim 1, wherein said inorganic fibers have a fiber length of at least about 0.1 mm and at most about 100 mm.

5. The inorganic fiber aggregate according to claim 4, wherein
   said inorganic fibers have the fiber length of at least about 0.5 mm and at most about 50 mm.

6. The inorganic fiber aggregate according to claim 1, wherein
   said inorganic fibers have a fiber diameter of at least about 0.3 μm and at most about 30 μm.

7. The inorganic fiber aggregate according to claim 6, wherein
   said inorganic fibers have the fiber diameter of at least about 0.5 μm to at most about 15 μm.

8. The inorganic fiber aggregate according to claim 1, wherein the inorganic fiber aggregate has a tensile strength of about 0.3 MPa or more.

9. The inorganic fiber aggregate according to claim 1, wherein the intersections comprises an area within a predetermined distance from a center of each of the intersections, the predetermined distance being 10 times as long as a fiber diameter of the inorganic fibers.

10. The inorganic fiber aggregate according to claim 1, wherein a weight ratio of the inorganic fibers to the inorganic material is in the range of about 2:8 to about 8:2.

11. A honeycomb structure having a plurality of through holes extending along a longitudinal direction of the honeycomb structure, comprising:
    inorganic fiber aggregates each of which has element through holes formed therein and which are laminated in the longitudinal direction in such a way that said element through holes are superposed on one another to form the plurality of through holes separated by walls,
    said inorganic fiber aggregates comprising inorganic fibers and an inorganic material, the inorganic material comprising glass that has a lower melting point than the inorganic fibers,
    wherein
    the inorganic material which melted is provided to fix the inorganic fibers to each other,
    the inorganic fibers are fixed to each other by the melted inorganic material at the intersections of the inorganic fibers,
    the inorganic material is locally provided at the intersections of the inorganic fibers, and
    at least about 20% of all of the intersections of the inorganic fibers are fixed to each other.

12. The honeycomb structure according to claim 11, wherein
    said inorganic material contains silica.

13. The honeycomb structure according to claim 11, wherein said inorganic fibers comprise at least one selected from the group consisting of silicon carbide, alumina, basalt, silica, silica alumina, titania and zirconia.

14. The honeycomb structure according to claim 11, wherein said inorganic fibers comprise at least one selected from the group consisting of silicon carbide, alumina, basalt, silica, silica alumina, titania and zirconia.

15. The honeycomb structure according to claim 11, wherein each of said through holes is sealed at either end of said honeycomb structure so as to function as a filter.

16. The honeycomb structure according to claim 11, further comprising:
    a catalyst supported on at least a portion of said inorganic fibers.

17. The honeycomb structure according to claim 11, wherein
    said inorganic fibers have a fiber length of at least about 0.1 mm and at most about 100 mm.

18. The honeycomb structure according to claim 11, wherein
    said inorganic fibers have a fiber diameter of at least about 0.3 μm and at most about 30 μm.

19. The honeycomb structure according to claim 11, wherein the inorganic fiber aggregate has a tensile strength of about 0.3 MPa or more.

20. The honeycomb structure according to claim 11, wherein said inorganic material covers the intersection of said inorganic fibers.

21. The honeycomb structure according to claim 11, wherein said glass comprises at least one inorganic glass selected from the group consisting of silicate glass, silicate alkali glass, and borosilicate glass.

22. The honeycomb structure according to claim 11, wherein said inorganic material is formed by heating glass fibers.

23. The honeycomb structure according to claim 11, wherein said inorganic material has a curved surface thereon.

24. The honeycomb structure according to claim 11, wherein said inorganic material exist at a plurality of locations, and spaces formed among said inorganic fibers exist among said plurality of locations.

25. The honeycomb structure according to claim 11, wherein the intersections comprises an area within a predetermined distance from a center of each of the intersections, the predetermined distance being 10 times as long as a fiber diameter of the inorganic fibers.

26. The honeycomb structure according to claim 11, wherein the inorganic fiber aggregates have an apparent density of at least about 0.02 g/cm³ and at most about 1.00 g/cm³.

27. The honeycomb structure according to claim 11, wherein the inorganic fiber aggregates have a porosity of at least about 60% by volume and at most about 98% by volume.

28. The honeycomb structure according to claim 11, wherein the inorganic fiber aggregates are bonded to each other.

29. The honeycomb structure according to claim 11, wherein the walls have thickness of at least about 0.2 mm and at most about 10.0 mm.

30. The honeycomb structure according to claim 11, wherein a weight ratio of the inorganic fibers to the inorganic material is in the range of about 2:8 to about 8:2.

31. A honeycomb structure having a plurality of through holes extending along a longitudinal direction of the honeycomb structure, comprising:

inorganic fiber aggregates each of which has element through holes formed therein and which are laminated in the longitudinal direction in such a way that said element through holes are superposed on one another to form the plurality of through holes separated by walls, said inorganic fiber aggregates comprising inorganic fibers and an inorganic material, the inorganic material being provided on the inorganic fibers to fix the inorganic fibers each other; and a plate member comprising metal and laminated on each end of a laminate of said inorganic fiber aggregates, wherein the inorganic fibers are fixed to each other at intersections of the inorganic fibers, the inorganic material is locally provided at the intersection of said inorganic fibers, and at least about 20% of all of the intersections of the inorganic fibers are fixed to each other.

32. An exhaust gas purifier for a vehicle comprising:

a honeycomb structure having a plurality of through holes extending along a longitudinal direction of the honeycomb structure, the honeycomb structure comprising:

inorganic fiber aggregates each of which has element through holes formed therein and which are laminated in the longitudinal direction in such a way that said element through holes are superposed on one another to form the plurality of through holes separated by walls, said inorganic fiber aggregates comprising inorganic fibers and an inorganic material, the inorganic material comprising glass that has a lower melting point than said inorganic fibers, wherein the inorganic material which melted is provided to fix the inorganic fibers to each other, the inorganic fibers are fixed to each other by the melted inorganic material at the intersections of the inorganic fibers, the inorganic material is locally provided at the intersections of the inorganic fibers, and at least about 20% of all of the intersections of the inorganic fibers are fixed to each other.

* * * * *